US008724455B2

(12) United States Patent
Berg et al.

(10) Patent No.: US 8,724,455 B2
(45) Date of Patent: May 13, 2014

(54) DISTRIBUTED CONTROL OF A FAIL-TO-WIRE SWITCH FOR A NETWORK COMMUNICATION LINK

(75) Inventors: William F. Berg, Rochester, MN (US); Jeremiah D. Carlin, Rochester, MN (US); Scott A. Liebl, Oronoco, MN (US); George W. Van Leeuwen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 13/355,250

(22) Filed: Jan. 20, 2012

(65) Prior Publication Data

US 2013/0188477 A1 Jul. 25, 2013

(51) Int. Cl.
*H04L 12/26* (2006.01)

(52) U.S. Cl.
USPC .......................... 370/221; 370/242; 370/328

(58) Field of Classification Search
None
See application file for complete search history.

(56) References Cited

U.S. PATENT DOCUMENTS

| | | | |
|---|---|---|---|
| 5,132,962 A | 7/1992 | Hobgood et al. | |
| 5,287,506 A | 2/1994 | Whiteside | |
| 5,390,324 A | 2/1995 | Burckhartt et al. | |
| 5,708,776 A | 1/1998 | Kikinis | |
| 6,038,618 A | 3/2000 | Beer et al. | |
| 7,724,707 B2 | 5/2010 | Foster et al. | |
| 7,916,649 B2 | 3/2011 | Buvaneswari et al. | |
| 7,979,733 B2 | 7/2011 | Erdtmann et al. | |
| 8,023,491 B2 | 9/2011 | Gruber | |
| 2002/0162059 A1 | 10/2002 | McNeely et al. | |
| 2003/0131170 A1 | 7/2003 | Chen et al. | |
| 2004/0059966 A1* | 3/2004 | Chan et al. | 714/48 |
| 2006/0002292 A1* | 1/2006 | Chang et al. | 370/225 |
| 2008/0267128 A1 | 10/2008 | Bennett et al. | |
| 2009/0213730 A1* | 8/2009 | Zeng et al. | 370/217 |

(Continued)

FOREIGN PATENT DOCUMENTS

| | | |
|---|---|---|
| EP | 0837581 A2 | 4/1998 |
| WO | 03041279 A2 | 5/2003 |

(Continued)

OTHER PUBLICATIONS

International Search Report and Written Opinion of the ISA dated Feb. 22, 2013—International Application No. PCT/EP2012/071486.

(Continued)

*Primary Examiner* — Ian N Moore
*Assistant Examiner* — Eric P Smith
(74) *Attorney, Agent, or Firm* — Martin & Associates, LLC; Derek P. Martin

(57) ABSTRACT

A fail-to-wire (FTW) module preserves a primary data path connection from an upstream computer to a downstream computer if there is any kind of failure in a breakout data path to a breakout system. The FTW module provides switches between the incoming data network data and the breakout system such that when the breakout system encounters a failure, the switches are de-activated to bypass the breakout system. The switches in the FTW module are activated by a system health signal controlled by a health monitor in the breakout system. The health monitor provides intelligent switch control based on alerts from a variety of control points. These control points include firmware, hardware, thermal sensors, subsystem operating systems, subsystem software applications, and appliance tamper logic in order to determine if the FTW module switches should be in an active or inactive state.

17 Claims, 27 Drawing Sheets

(56) References Cited

U.S. PATENT DOCUMENTS

| | | |
|---|---|---|
| 2009/0232015 A1 | 9/2009 | Domschitz et al. |
| 2010/0130170 A1 | 5/2010 | Liu et al. |
| 2010/0232353 A1 | 9/2010 | Hu et al. |
| 2011/0070906 A1 | 3/2011 | Chami et al. |
| 2011/0075675 A1 | 3/2011 | Koodli et al. |
| 2011/0103310 A1 | 5/2011 | Stojanovski et al. |
| 2011/0235595 A1 | 9/2011 | Mehta et al. |
| 2012/0188895 A1 | 7/2012 | Punz et al. |
| 2012/0243432 A1 | 9/2012 | Liebsch et al. |

FOREIGN PATENT DOCUMENTS

| | | |
|---|---|---|
| WO | 2011018235 A1 | 2/2011 |
| WO | 2011021875 A2 | 2/2011 |
| WO | WO20110182351 A1 | 2/2011 |
| WO | 2011091861 A1 | 8/2011 |
| WO | 2011101131 A1 | 8/2011 |

OTHER PUBLICATIONS

Kundalkar et al., "LIPA: Local IP Access via Home Node B", Nov. 13, 2009.

Pending U.S. Patent Application entitled "Mobile Network Services in a Mobile Data Network", U.S. Appl. No. 13/233,812, filed Sep. 15, 2011 by Bruce O. Anthony, Jr. et al.

Pending U.S. Patent Application entitled "Fail to Wire Removable Module for Network Communication Link", U.S. Appl. No. 13/297,7342, filed Nov. 16, 2011 by Raymond F. Babcock et al.

Kundalkar et al., "LIPA: Local IP Access via Home Node B," downloaded Oct. 18, 2011.

"Opengear Quad-Band GSM/UMTS/HSPA Cellular Appliance Gains PTCRB Certification," Press Release Oct. 20, 2011.

"PSE 3G VAS Genie," http://www.mirial.com/products/PSE_VAS_Genie.html, printed Oct. 18, 2011.

"UMTS / HSDPA connection with UTM-1 Edge Appliance an T-D1 SIM Card," CPShared, printed Sep. 21, 2011.

Bruce O. Anthony, Jr. et al., U.S. Appl. No. 13/297,770, entitled "Data Breakout at the Edge of a Mobile Data Network," filed Nov. 16, 2011.

William F. Berg et al., U.S. Appl. No. 13/297,807, entitled "Data Breakout Appliance at the Edge of a Mobile Data Network," filed Nov. 16, 2011.

* cited by examiner

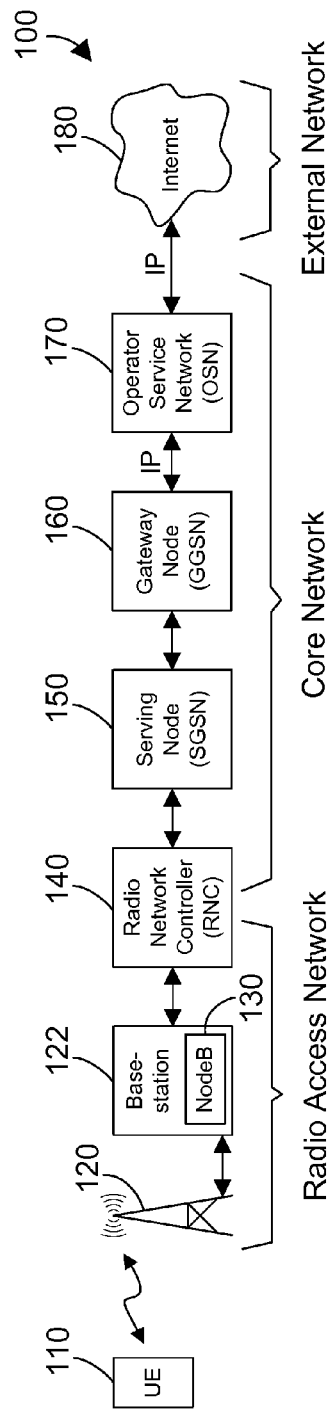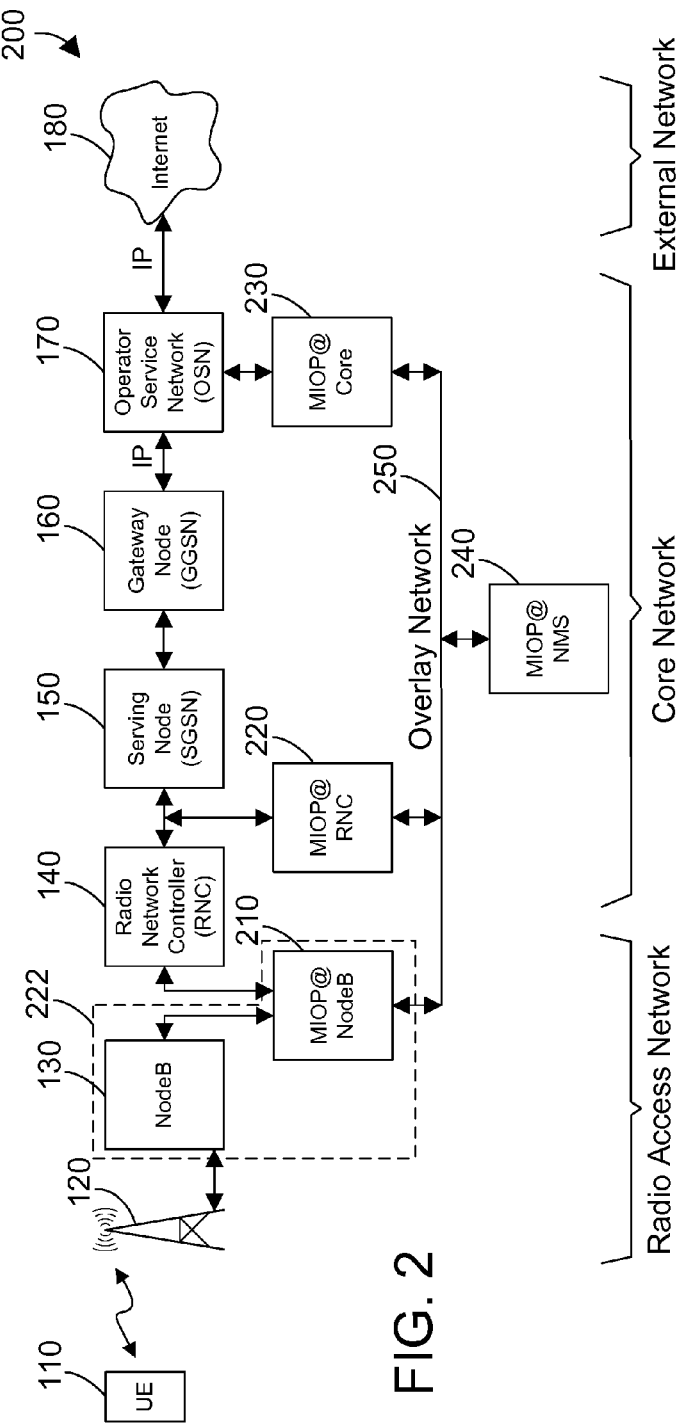

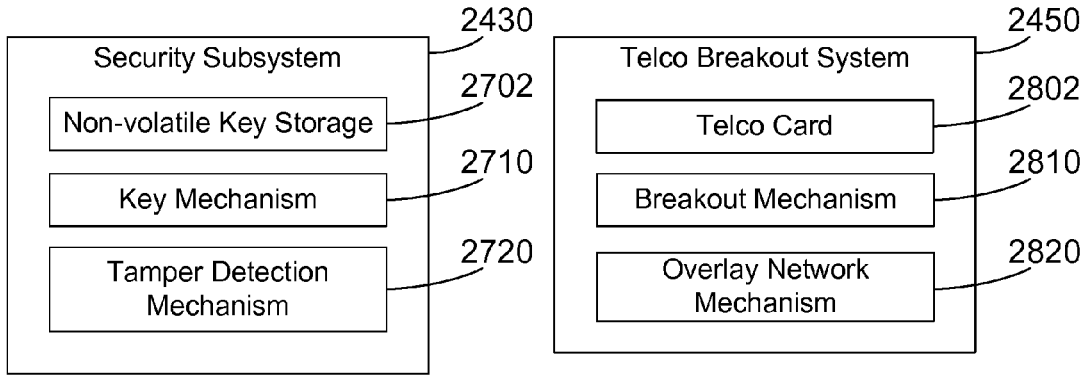
FIG. 27
FIG. 28
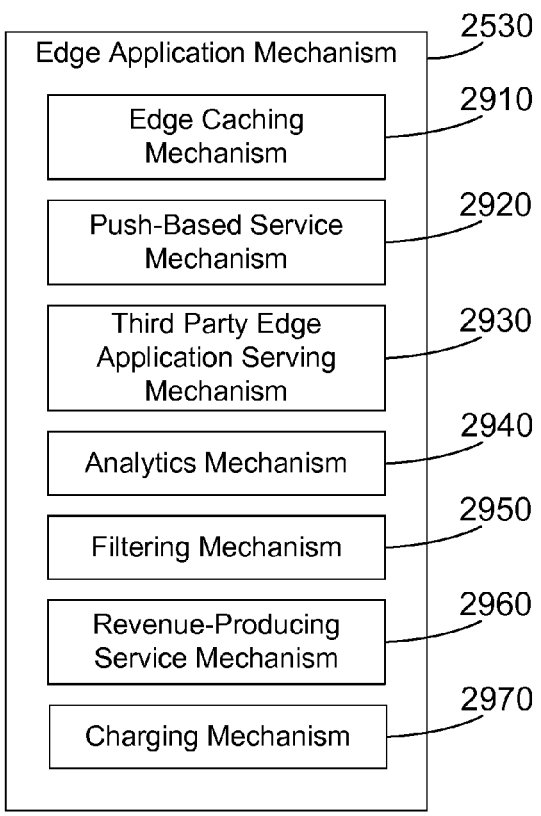
FIG. 29

DISTRIBUTED CONTROL OF A FAIL-TO-WIRE SWITCH FOR A NETWORK COMMUNICATION LINK

BACKGROUND

1. Technical Field

This disclosure generally relates to network communication systems such as a mobile data network, and more specifically relates to distributed control of a fail-to-wire switch for network recovery of a broken out communication data path to a breakout system in the event of a failure of the breakout system.

2. Background Art

Mobile phones have evolved into "smart phones" that allow a user not only to make a call, but also to access data, such as e-mails, the internet, etc. Mobile phone networks have evolved as well to provide the data services that new mobile devices require. For example, 3G networks cover most of the United States, and allow users high-speed wireless data access on their mobile devices. In addition, phones are not the only devices that can access mobile data networks. Many mobile phone companies provide equipment and services that allow a subscriber to use Bluetooth, WiFi or a Universal Serial Bus (USB) connection to provide wireless internet to the laptop computer through the mobile data network. In addition, some newer mobile phones allow the mobile phone to function as a wireless hotspot, which supports connecting several laptop computers or other wireless devices to the mobile phone, which in turn provides data services via the mobile data network. As time marches on, the amount of data served on mobile data networks will continue to rise exponentially.

Mobile data networks include very expensive hardware and software, so upgrading the capability of existing networks is not an easy thing to do. It is not economically feasible for a mobile network provider to simply replace all older equipment with new equipment due to the expense of replacing the equipment. For example, the next generation wireless network in the United States is the 4G network. Many mobile data network providers are still struggling to get their entire system upgraded to provide 3G data services. Immediately upgrading to 4G equipment is not an economically viable option for most mobile data network providers. In many locations, portions of the mobile data network are connected together by point to point microwave links. These microwave links have limited bandwidth. To significantly boost the throughput of this links requires the microwave links to be replaced with fiber optic cable but this option is very costly.

To facilitate additional capacity on mobile networks, a new "edge server" or "breakout system" is being developed by International Business Machines Corporation (IBM). The breakout system or edge server is also referred to as a Mobile Internet Optimization Platform (MIOP). The MIOP corresponding to each basestation is referred to as a MIOP@NodeB. The MIOP@NodeB offloads data streams such as internet data streams for at the edge processing while passing through the voice streams to the backend of the network. As used herein, the term "breakout system" in general means a system that connects between two computer systems on a data network and passes on some of the data on the data network between the two systems while breaking out for local processing other data streams normally flowing between the two computer systems on the data network. The breakout system could broadly be construed as a network processing device or mechanism capable of routing all or part of the network traffic on a network data path between two other nodes through itself.

BRIEF SUMMARY

A fail to wire (FTW) module preserves a primary data path connection from an upstream computer to a downstream computer if there is any kind of failure in a breakout data path to a breakout system. In the illustrated example, the primary data path is a voice/data stream connection from a basestation to the backend of a mobile data network that is preserved if there is a failure in the breakout system or edge server (MIOP@NodeB). The FTW module provides switches between the incoming voice/data streams and the breakout system such that when the breakout system encounters a failure, the switches are de-activated to bypass the breakout system and cause the un-processed voice/data streams to be output onto the mobile network without modification or interruption. The switches in the FTW module are activated by a system health signal controlled by a health monitor in the breakout system. The health monitor is a software mechanism for both enabling and disabling the FTW module switches. The health monitor provides intelligent switch control based on alerts from a variety of control points. These control points include firmware, hardware, thermal sensors, subsystem operating systems, subsystem software applications, and appliance tamper logic in order to determine if the FTW module switches should be in an active or inactive state.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 1 is a block diagram of a prior art mobile data network;

FIG. 2 is a block diagram of a mobile data network that includes first, second and third service mechanisms that all communicate via an overlay network;

FIG. 27 is a block diagram of the security subsystem shown in FIG. 24;

FIG. 28 is a block diagram of the telco breakout system shown in FIG. 24;

FIG. 29 is a block diagram of the edge application mechanism 2530 shown in FIG. 25 that performs multiple services at the edge of a mobile data network based on data broken-out at the edge of the mobile data network;

DETAILED DESCRIPTION

Figure 3:
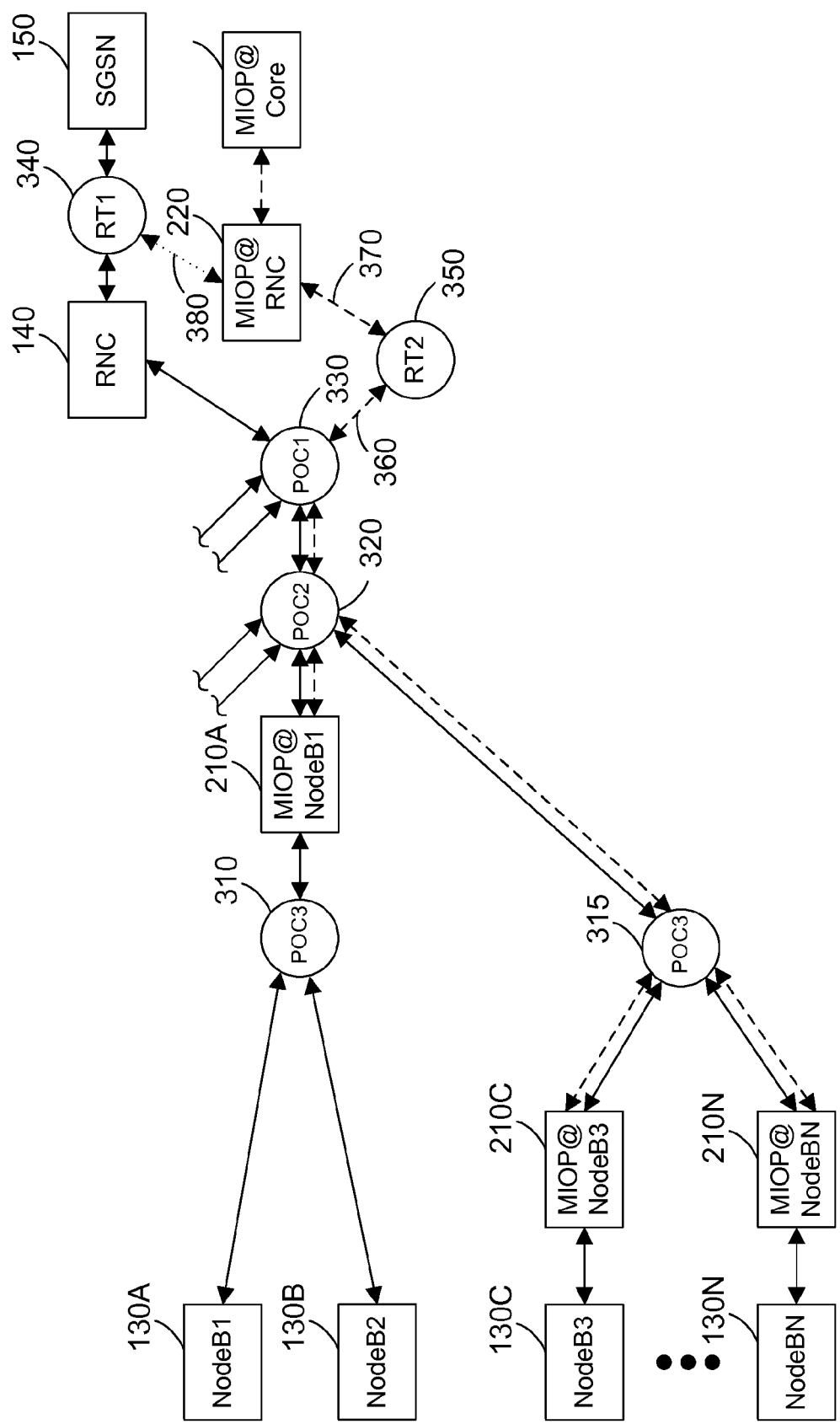
FIG. 3 is a block diagram of one possible implementation for parts of the mobile data network shown in FIG. 2 to illustrate the overlay network.

The claims and disclosure herein provide a fail-to-wire (FTW) module that preserves a primary data path connection from an upstream computer to a downstream computer if there is any kind of failure in a breakout data path to a breakout system. In the illustrated example, the primary data path is a voice/data stream connection from a basestation to the backend of a mobile data network that is preserved if there is a failure in the breakout system (MIOP@NodeB). The FTW module provides switches between the incoming voice/data streams and the breakout system such that when the server encounters a failure, the switches are de-activated to bypass the breakout system and cause the un-processed voice/data streams to be output onto the mobile network without modification or interruption. The switches in the FTW module are activated by a system health signal controlled by a health monitor in the breakout system. The health monitor is a software mechanism for both enabling and disabling the FTW module switches. The health monitor provides intelligent switch control based on alerts from a variety of control points. These control points include firmware, hardware, thermal sensors, subsystem operating systems, subsystem software applications, and appliance tamper logic in order to determine if the FTW module switches should be in an active or inactive state.

The basestations of a mobile data network need to be robust to maintain the constant flow of data to and from user equipment over the network. These basestations are often in remote locations that are not easy to service. It is important that any failure of a breakout systems not take down the entire basestation. A failure of the breakout system needs to be managed such that the breakout system failure, which is tasked to enhance the basestation, will not adversely affect the basestation. The FTW module as described herein works to remove the breakout system in the event of a failure in such a way that the mobile data network functions as if the breakout system is no longer present.

Referring to FIG. 1, a prior art mobile data network 100 is shown. Mobile data network 100 is representative of known 3G networks. The mobile data network 100 preferably includes a radio access network (RAN), a core network, and an external network, as shown in FIG. 1. The radio access network includes the tower 120, basestation 122 with its corresponding NodeB 130, and a radio interface on a radio network controller (RNC) 140. The core network includes a network interface on the radio network controller 140, the serving node 150, gateway node 160 and operator service network 170 (as part of the mobile data network). The external network includes any suitable network. One suitable example for an external network is the internet 180, as shown in the specific example in FIG. 1.

In mobile data network 100, user equipment 110 communicates via radio waves to a tower 120. User equipment 110 may include any device capable of connecting to a mobile data network, including a mobile phone, a tablet computer, a mobile access card coupled to a laptop computer, etc. The tower 120 communicates via network connection to a basestation 122. Each basestation 122 includes a NodeB 130, which communicates with the tower 120 and the radio network controller 140. Note there is a fan-out that is not represented in FIG. 1. Typically there are tens of thousands of towers 120. Each tower 120 typically has a corresponding base station 122 with a NodeB 130 that communicates with the tower. However, network communications with the tens of thousands of base stations 130 are performed by hundreds of radio network controllers 140. Thus, each radio network controller 140 can service many NodeBs 130 in basestations 122. There may also be other items in the network between the basestation 130 and the radio network controller 140 that are not shown in FIG. 1, such as concentrators (points of concentration) or RAN aggregators that support communications with many basestations.

The radio network controller 140 communicates with the serving node 150. In a typical 3G network, the serving node 150 is an SGSN, which is short for Service GPRS Support Node, where GPRS stands for general packet radio service. The serving node 150 mediates access to network resources on behalf of mobile subscribers and implements the packet scheduling policy between different classes of quality of service. It is also responsible for establishing the Packet Data Protocol (PDP) context with the gateway node 160 for a given subscriber session. The serving node 150 is responsible for the delivery of data packets from and to the basestations within its geographical service area. The tasks of the serving node 150 include packet routing and transfer, mobility management (attach/detach and location management), logical link management, and authentication and charging functions. The serving node 150 stores location information and user profiles of all subscribers registered with the serving node 150. Functions the serving node 150 typically performs include GPRS tunneling protocol (GTP) tunneling of packets, performing mobility management as user equipment moves from one basestation to the next, and billing user data.

In a typical 3G network, the gateway node 160 is a GGSN, which is short for gateway GPRS support node. The gateway node 160 is responsible for the interworking between the core network and external networks. From the viewpoint of the external networks 180, gateway node 160 is a router to a sub-network, because the gateway node 160 "hides" the core network infrastructure from the external network. When the gateway node 160 receives data from an external network (such as internet 180) addressed to a specific subscriber, it forwards the data to the serving node 150 serving the subscriber. For inactive subscribers paging is initiated. The gateway node 160 also handles routing packets originated from the user equipment 110 to the appropriate external network. As anchor point the gateway node 160 supports the mobility of the user equipment 110. In essence, the gateway node 160 maintains routing necessary to tunnel the network packets to the serving node 150 that services a particular user equipment 110.

The gateway node 160 converts the packets coming from the serving node 150 into the appropriate packet data protocol (PDP) format (e.g., IP or X.25) and sends them out on the corresponding external network. In the other direction, PDP addresses of incoming data packets from the external network 180 are converted to the address of the subscriber's user equipment 110. The readdressed packets are sent to the responsible serving node 150. For this purpose, the gateway node 160 stores the current serving node address of the subscriber and his or her profile. The gateway node 160 is responsible for IP address assignment and is the default router for the subscriber's user equipment 110. The gateway node 160 also performs authentication, charging and subscriber policy functions. One example of a subscriber policy function is "fair use" bandwidth limiting and blocking of particular traffic types such as peer to peer traffic. Another example of a subscriber policy function is degradation to a 2G service level for a prepaid subscriber when the prepaid balance is zero.

A next hop router located in the operator service network (OSN) 170 receives messages from the gateway node 160, and routes the traffic either to the operator service network 170 or via an internet service provider (ISP) towards the internet 180. The operator service network 170 typically includes business logic that determines how the subscriber can use the mobile data network 100. The business logic that provides services to subscribers may be referred to as a "walled garden", which refers to a closed or exclusive set of services provided for subscribers, including a carrier's control over applications, content and media on user equipment.

Devices using mobile data networks often need to access an external network, such as the internet 180. As shown in FIG. 1, when a subscriber enters a request for data from the internet, that request is passed from the user equipment 110 to tower 120, to NodeB 130 in basestation 122, to radio network controller 140, to serving node 150, to gateway node 160, to operator service network 170, and to internet 180. When the requested data is delivered, the data traverses the entire network from the internet 180 to the user equipment 110. The capabilities of known mobile data networks 100 are taxed by the ever-increasing volume of data being exchanged between user equipment 110 and the internet 180 because all data between the two have to traverse the entire network.

Some efforts have been made to offload internet traffic to reduce the backhaul on the mobile data network. For example, some mobile data networks include a node called a HomeNodeB that is part of the radio access network. Many homes have access to high-speed Internet, such as Direct Subscriber Line (DSL), cable television, wireless, etc. For example, in a home with a DSL connection, the HomeNodeB takes advantage of the DSL connection by routing Internet traffic to and from the user equipment directly to the DSL connection, instead of routing the Internet traffic through the mobile data network. While this may be an effective way to offload Internet traffic to reduce backhaul, the HomeNodeB architecture makes it difficult to provide many mobile network services such as lawful interception, mobility, and charging consistently with the 3G or 4G mobile data network.

Referring to FIG. 2, a mobile data network 200 includes mechanisms that provide various services for the mobile data network in a way that is transparent to most of the existing equipment in the mobile data network. FIG. 2 shows user equipment 110, tower 120, NodeB 130, radio network controller 140, serving node 150, gateway node 160, operator service node 170, and internet 180, the same as shown in FIG. 1. The additions to the mobile data network 200 when compared with the prior art mobile data network 100 in FIG. 1 include the addition of three components that may provide mobile network services in the mobile data network, along with a network management mechanism to manage the three components. The mobile network services are performed by what is called herein a Mobile Internet Optimization Platform (MIOP), and the mobile network services performed by the Mobile Internet Optimization Platform are referred to herein as MIOP services. The three MIOP components that provide these mobile network services are shown in FIG. 2 as MIOP@NodeB 210, MIOP@RNC 220 and MIOP@Core 230. A network management system shown as MIOP@NMS 240 manages the overall solution by: 1) managing the function of the three MIOP components 210, 220 and 230; 2) determining which MIOP@NodeBs in the system aggregate to which MIOP@RNCs via the overlay network for performance, fault and configuration management; and 3) monitoring performance of the MIOP@NodeBs to dynamically change and configure the mobile network services. The MIOP@NodeB 210, MIOP@RNC 220, MIOP@Core 230, MIOP@NMS 240, and the overlay network 250, and any subset of these, and are referred to herein as MIOP components.

The mobile network services provided by MIOP@NodeB 210, MIOP@RNC 220, and MIOP@Core 230 include any suitable services on the mobile data network, such as data optimizations, RAN-aware services, subscriber-aware services, edge-based application serving, edge-based analytics, etc. All mobile network services performed by all of MIOP@NodeB 210, MIOP@RNC 220, and MIOP@Core 230 are included in the term MIOP services as used herein. In addition to the services being offer in the MIOP components MIOP@NodeB 210, MIOP@RNC 220, and MIOP@Core 230, the various MIOP services could also be provided in a cloud based manner.

MIOP@NodeB 210 includes a first service mechanism and is referred to as the "edge" based portion of the MIOP solution. MIOP@NodeB 210 resides in the radio access network and has the ability to intercept all traffic to and from the NodeB 130. MIOP@NodeB 210 preferably resides in the base station 222 shown by the dotted box in FIG. 2. Thus, all data to and from the NodeB 130 to and from the radio network controller 140 is routed through MIOP@NodeB 210. MIOP@NodeB performs what is referred to herein as breakout of data on the intercepted data stream. MIOP@ NodeB monitors the signaling traffic between NodeB and RNC and on connection setup intercepts in particular the setup of the transport layer (allocation of the UDP Port, IP address or AAL2 channel). For registered sessions the breakout mechanism 410 will be configured in a way that all traffic belonging to this UDP Port, IP address to AAL2 channel will be forwarded to an data offload function. MIOP@NodeB 210 thus performs breakout of data by defining a previously-existing path in the radio access network for non-broken out data, by defining a new second data path that did not previously exist in the radio access network for broken out data, identifying data received from a corresponding NodeB as data to be broken out, sending the data to be broken out on the second data path, and forwarding other data that is not broken out on the first data path. The signaling received by MIOP@NodeB 210 from NodeB 130 is forwarded to RNC 140 on the existing network connection to RNC 140, even though the data traffic is broken out. Thus, RNC 140 sees the signaling traffic and knows the subscriber session is active, but does not see the user data that is broken out by MIOP@NodeB 210. MIOP@NodeB thus performs two distinct functions depending on the monitored data packets: 1) forward the data packets to RNC 140 for signaling traffic and user data that is not broken out (including voice calls); and 2) re-route the data packets for user data that is broken out.

Once MIOP@NodeB 210 breaks out user data it can perform any suitable service based on the traffic type of the broken out data. Because the services performed by MIOP@NodeB 210 are performed in the radio access network (e.g., at the basestation 222), the MIOP@NodeB 210 can service the user equipment 110 much more quickly than can the radio network controller 140. In addition, by having a MIOP@NodeB 210 that is dedicated to a particular NodeB 130, one MIOP@NodeB only needs to service those subscribers that are currently connected via a single NodeB. The radio network controller, in contrast, which typically services dozens or even hundreds of basestations, must service all the subscribers accessing all basestations it controls from a remote location. As a result, MIOP@NodeB is in a much better position to provide services that will improve the quality of service and experience for subscribers than is the radio network controller.

Breaking out data in the radio access network by MIOP@NodeB 210 allows for many different types of services to be performed in the radio access network. These services may include optimizations that are similar to optimizations provided by known industry solutions between radio network controllers and the serving node. However, moving these optimizations to the edge of the mobile data network will not only greatly improve the quality of service for subscribers, but will also provide a foundation for applying new types of services at the edge of the mobile data network, such as terminating machine-to-machine (MTM) traffic at the edge (e.g., in the basestation), hosting applications at the edge, and performing analytics at the edge.

MIOP@RNC 220 includes a second service mechanism in mobile data network 200. MIOP@RNC 220 monitors all communication between the radio network controller 140 and serving node 150. The monitored communications are all communications to and from the radio network controller and the rest of the core network. MIOP@RNC 220 may provide one or more services for the mobile data network. MIOP@RNC 220 preferably makes the decision of whether or not to allow breakout of data. If MIOP@RNC 220 decides to breakout data for a given subscriber session, it may send a message to MIOP@NodeB 210 authorizing breakout by MIOP@NodeB 210, or may decide to breakout the data at MIOP@RNC 220, depending on the configured breakout decision criteria and selected radio channel. Because messages to and from the core network establishing the PDP context for a given subscriber session are monitored by MIOP@RNC 220, the decision of whether or not to breakout data resides in the MIOP@RNC 220.

MIOP@Core 230 includes a third service mechanism in the mobile data network 200. MIOP@Core 230 may include all the same services as MIOP@RNC 220, or any suitable subset of those services. If the decision is made not to provide services at MIOP@NodeB 210 or MIOP@RNC 220, these same services plus more sophisticated services can be performed at MIOP@Core 230. Thus, mobile data network 200 provides flexibility by allowing a decision to be made of where to perform which services. Because MIOP@NodeB 210, MIOP@RNC 220 and MIOP@Core 230 preferably include some of the same services, the services between components may interact (e.g., MIOP@NodeB and MIOP@Core may interact to optimize TCP traffic between them), or the services may be distributed across the mobile data network (e.g., MIOP@NodeB performs breakout and provides services for high-speed traffic, MIOP@RNC performs breakout and provides services for low-speed traffic, and MIOP@Core provides services for non-broken out traffic). The MIOP system architecture thus provides a very powerful and flexible solution, allowing dynamic configuring and reconfiguring on the fly of which services are performed by the MIOP components and where. In addition, these services may be implemented taking advantage of existing infrastructure in a mobile data network.

MIOP@NMS 240 is a network management system that monitors and controls the functions of MIOP@NodeB 210, MIOP@RNC 220, and MIOP@Core 230. MIOP@ NMS 240 preferably includes MIOP internal real-time or near real-time performance data monitoring to determine if historical or additional regional dynamic changes are needed to improve services on the mobile data network 200. MIOP@NMS 240 provides a user interface that allows a system administrator to operate and to configure how the MIOP components 210, 220 and 230 function.

The overlay network 250 allows MIOP@NodeB 210, MIOP@RNC 220, MIOP@Core 230, and MIOP@NMS 240 to communicate with each other. The overlay network 250 is preferably a virtual private network primarily on an existing physical network in the mobile data network. Thus, while overlay network 250 is shown in FIG. 2 separate from other physical network connections, this representation in FIG. 2 is a logical representation.

FIG. 3 shows one suitable implementation of a physical network and the overlay network in a sample mobile data system. The existing physical network in the mobile data network before the addition of the MIOP@NodeB 210, MIOP@RNC 220, and MIOP@Core 230 is shown by the solid lines with arrows. This specific example in FIG. 3 includes many NodeBs, shown in FIG. 1 as 130A, 130B, 130C, . . . , 130N. Some of the NodeBs have a corresponding MIOP@NodeB. FIG. 3 illustrates that MIOP@NodeBs (such as 210A and 210N) can be placed in a basestation with its corresponding NodeB, or can be placed upstream in the network after a point of concentration (such as 210A after POC3 310). FIG. 3 also illustrates that a single MIOP@NodeB such as MIOP@NodeB1 210A can service two different NodeBs, such as NodeB1 130A and NodeB2 130B. Part of the overlay network is shown by the dotted lines between MIOP@NodeB1 210A and second point of concentration POC2 320, between MIOP@NodeB3 210C and POC3 315, between MIOP@NodeBN 210N and POC3 315, and between POC3 315 and POC2 320. Note the overlay network in the radio access network portion is a virtual private network that is implemented on the existing physical network connections. The overlay network allows the MIOP@NodeBs 210A, 210C and 210N to communicate with each other directly, which makes some services possible in the mobile data network 200 that were previously impossible. FIG. 3 shows MIOP@NodeB1 210A connected to a second point of concentration POC2 320. The broken arrows coming in from above at POC2 320 represent connections to other NodeBs, and could also include connections to other MIOP@NodeBs. Similarly, POC2 320 is connected to a third point of concentration POC1 330, with possibly other NodeBs or MIOP@NodeBs connected to POC1. The RNC 140 is shown connected to POC1 330, and to a first router RT1 340 in the core network. The router RT1 340 is also connected to the SGSN 150. While not shown in FIG. 3 for the sake of simplicity, it is understood that SGSN in FIG. 3 is also connected to the upstream core components shown in FIG. 2, including GGSN 160, OSN 170 and internet 180.

As shown in FIG. 3, the overlay network from the NodeBs to POC1 330 is a virtual private network implemented on existing physical network connections. However, the overlay network requires a second router RT2 350, which is connected via a physical network connection 360 to POC1 330, and is connected via physical network connection 370 to MIOP@RNC 220. This second router RT2 350 may be a separate router, or may be a router implemented within MIOP@RNC 220. MIOP@RNC 220 is also connected to router RT1 340 via a physical network connection 380, and is also connected to MIOP@Core 230. Physical connection 380 in FIG. 3 is shown in a line with short dots because it is not part of the pre-existing physical network before adding the MIOP components (arrows with solid lines) and is not part of the overlay network (arrows with long dots). Note the connection from MIOP@RNC 220 to MIOP@Core 230 is via existing physical networks in the core network.

We can see from the configuration of the physical network and overlay network in FIG. 3 that minimal changes are needed to the existing mobile data network to install the MIOP components. The most that must be added is one new router 350 and three new physical network connections 360, 370 and 380. Once the new router 350 and new physical network connections 360, 370 and 380 are installed, the router 350 and MIOP components are appropriately configured, and the existing equipment in the mobile data network is configured to support the overlay network, the operation of the MIOP components is completely transparent to existing network equipment.

As can be seen in FIG. 3, data on the overlay network is defined on existing physical networks from the NodeBs to POC1. From POC1 the overlay network is on connection 360 to RT2 350, and on connection 370 to MIOP@RNC 220. Thus, when MIOP@NodeB 210 in FIG. 2 needs to send a message to MIOP@RNC 220, the message is sent by sending packets via a virtual private network on the physical network connections to POC1, then to RT2 350, then to MIOP@RNC 220. Virtual private networks are well-known in the art, so they are not discussed in more detail here.

Figure 4:
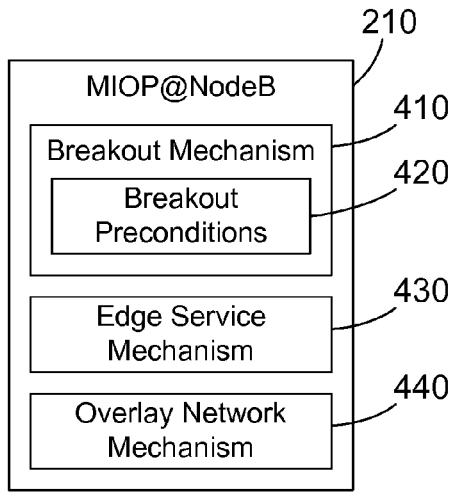
FIG. 4 is a block diagram of the MIOP@NodeB shown in FIG. 2, which includes a first service mechanism.

Referring to FIG. 4, MIOP@NodeB 210 preferably includes a breakout mechanism 410, an edge service mechanism 430, and an overlay network mechanism 440. The breakout mechanism 410 determines breakout preconditions 420 that, when satisfied, allow breakout to occur at this edge location. Breakout mechanism 410 in MIOP@NodeB 210 communicates with the breakout mechanism 510 in MIOP@RNC 220 shown in FIG. 5 to reach a breakout decision. The breakout mechanism 410, after receiving a message from MIOP@RNC 220 authorizing breakout on connection setup intercepts in particular the setup of the transport layer (allocation of the UDP Port, IP address or AAL2 channel). For authorized sessions the breakout mechanism 410 will be configured in a way that all traffic belonging to this UDP Port, IP address to AAL2 channel will be forwarded to a data offload function. For traffic that should not be broken out, the breakout mechanism 410 sends the data on the original data path in the radio access network. In essence, MIOP@NodeB 210 intercepts all communications to and from the basestation 130, and can perform services "at the edge", meaning at the edge of the radio access network that is close to the user equipment 110. By performing services at the edge, the services to subscribers may be increased or optimizes without requiring hardware changes to existing equipment in the mobile data network.

The breakout mechanism 410 preferably includes breakout preconditions 420 that specify one or more criterion that must be satisfied before breakout of data is allowed. One suitable example of breakout preconditions is the speed of the channel. In one possible implementation, only high-speed channels will be broken out at MIOP@NodeB 210. Thus, breakout preconditions 420 could specify that subscribers on high-speed channels may be broken out, while subscribers on low-speed channels are not broken out at MIOP@NodeB 210. When the breakout preconditions 420 are satisfied, the MIOP@NodeB 210 registers the subscriber session with MIOP@RNC 220. This is shown in method 800 in FIG. 8. MIOP@NodeB 210 intercepts and monitors network traffic to and from NodeB (basestation) (step 810). When the traffic does not satisfy the breakout preconditions (step 820=NO), method 800 returns to step 810. When the traffic satisfies the breakout conditions (step 820=YES), MIOP@NodeB 210 sends a message to MIOP@RNC 220 on the overlay network 250 to register the subscriber session for breakout (step 830). With the subscriber session registered with MIOP@RNC 220, the MIOP@RNC 220 will determine whether or not to breakout data for the subscriber session, and where the breakout is done, as explained in more detail below.

Referring back to FIG. 4, MIOP@NodeB 210 also includes an edge service mechanism 430. The edge service mechanism 430 provides one or more services for the mobile data network 200. The edge service mechanism 430 may include any suitable service for the mobile data network including without limitation caching of data, data or video compression techniques, push-based services, charging, application serving, analytics, security, data filtering, new revenue-producing services, etc. The edge service mechanism is the first of three service mechanisms in the MIOP components. While the breakout mechanism 410 and edge service mechanism 430 are shown as separate entities in FIG.

4, the first service mechanism could include both breakout mechanism 410 and edge service mechanism 430.

MIOP@NodeB 210 also includes an overlay network mechanism 440. The overlay network mechanism 440 provides a connection to the overlay network 250 in FIG. 2, thereby allowing MIOP@NodeB 210 to communicate with MIOP@RNC 220, MIOP@Core 230, and MIOP@NMS 240. As stated above, the overlay network 250 is preferably a virtual private network primarily on an existing physical network in the mobile data network 200.

Figure 5:
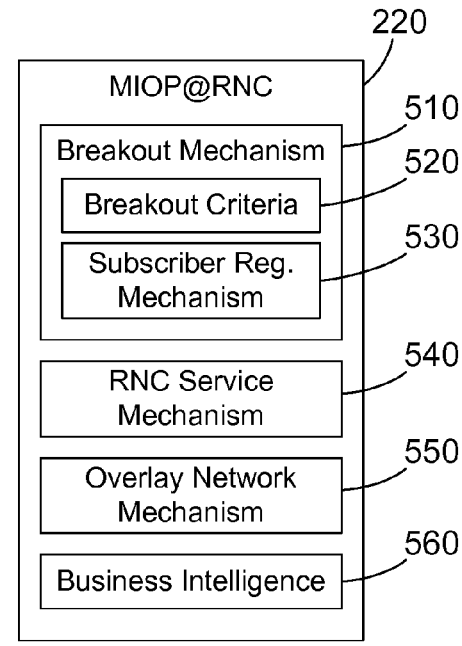
FIG. 5 is a block diagram of the MIOP@RNC shown in FIG. 2, which includes a second service mechanism.
Figure 8:
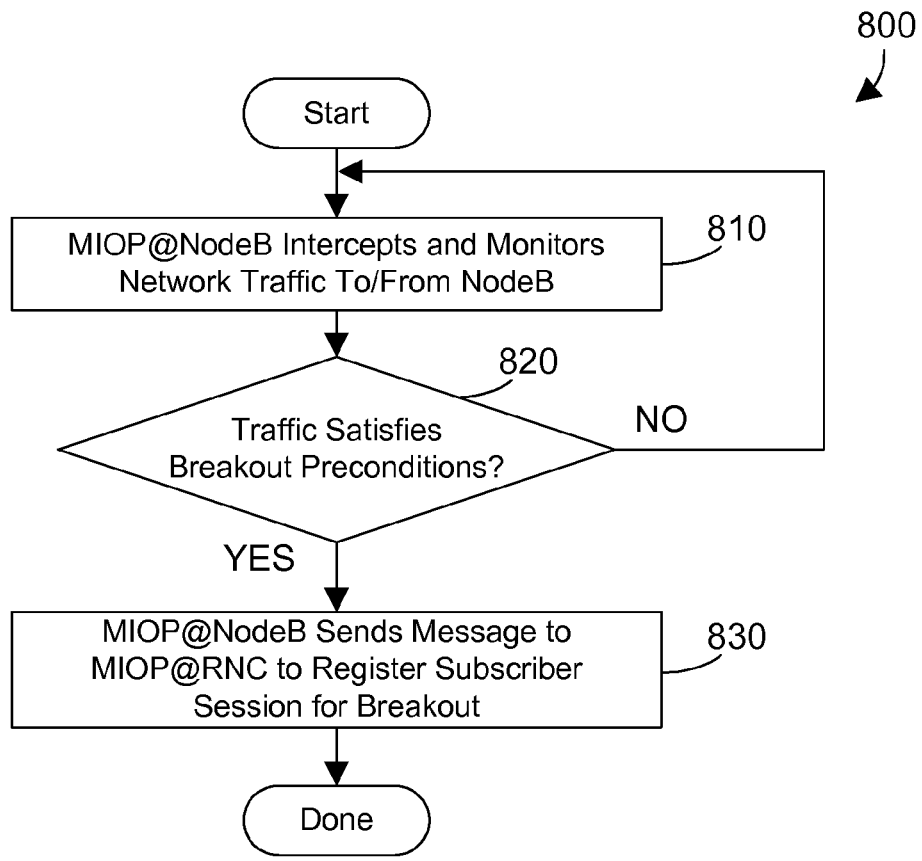
FIG. 8 is a flow diagram of a method performed by MIOP@NodeB shown in FIGS. 2 and 4.

Referring to FIG. 5, MIOP@RNC 220 preferably includes a breakout mechanism 510, an RNC service mechanism 540, an overlay network mechanism 550, and business intelligence 560. Breakout mechanism 510 includes breakout criteria 520 that specifies one or more criterion that, when satisfied, allows breakout of data. Subscriber registration mechanism 530 receives messages from MIOP@NodeB 210, and registers subscriber sessions for which the breakout preconditions 420 in MIOP@NodeB 210 are satisfied. When the breakout mechanism 510 determines the breakout criteria 520 is satisfied, the breakout mechanism 510 will then determine where the breakout should occur. When the breakout can occur at MIOP@NodeB 210, the MIOP@RNC 220 sends a message to MIOP@NodeB 210 on the overlay network 250 authorizing breakout at MIOP@NodeB 210. When the breakout should occur at MIOP@RNC 220, the breakout mechanism 510 in MIOP@RNC 220 performs the breakout as well for the traffic remaining then). This is shown in more detail in method 1000 in FIG. 10. MIOP@RNC monitors network traffic between the radio network controller 140 and the serving node 150 (step 1010). When the traffic does not satisfy the breakout criteria (step 1020=NO), method 1000 loops back to step 1010. When the network traffic satisfies the breakout criteria (step 1020=YES), the breakout mechanism 510 determines whether the subscriber session is registered for breakout (step 1030). A subscriber session is registered for breakout when the MIOP@NodeB 210 determined the traffic satisfied the breakout preconditions and registered the subscriber session for breakout, as shown in FIG. 8. Returning to FIG. 10, when the subscriber is registered for breakout (step 1030=YES), MIOP@RNC 220 sends a message via the overlay network 250 to MIOP@NodeB 210 authorizing breakout of traffic for the subscriber session (step 1040). MIOP@NodeB 210 may then breakout traffic for the subscriber session (step 1050). When the subscriber is not registered for breakout (step 1030=NO), method 1000 checks to see if MIOP@RNC is going to do breakout (step 1060). If not (step 1060=NO), method 1000 is done. When MIOP@RNC is going to do breakout (step 1060=YES), the traffic is then broken out at MIOP@RNC (step 1070).

Figure 10:
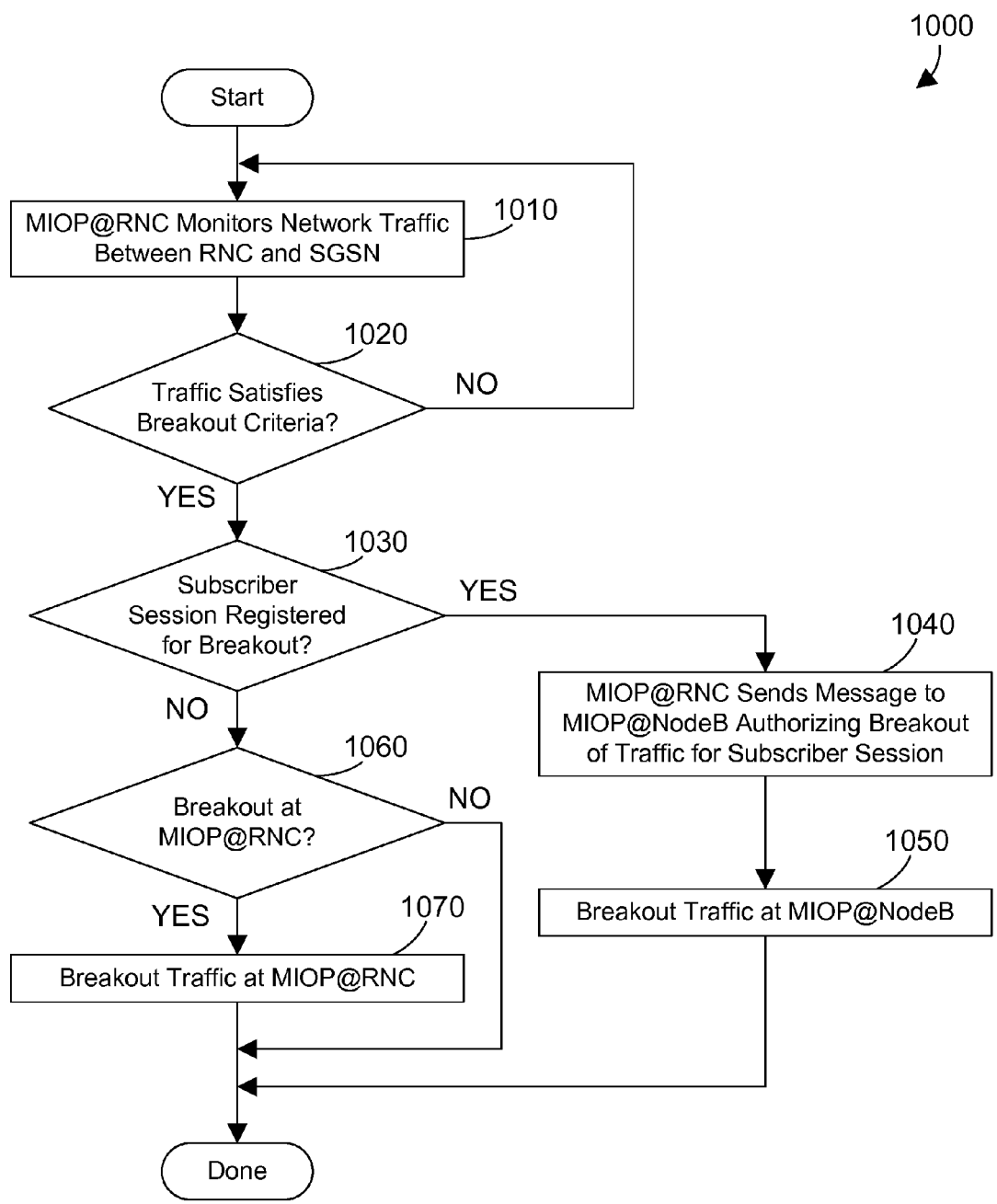
FIG. 10 is a flow diagram of a method for the MIOP@NodeB and MIOP@RNC to determine when to break out data.

In one specific example, the breakout preconditions specify only high-speed channels are broken out at MIOP@NodeB 210, and when the breakout preconditions are satisfied, the subscriber session is registered for breakout, as shown in FIG. 8. FIG. 10 illustrates that even when the breakout preconditions are not satisfied, breakout can still be performed at MIOP@RNC 220. Thus, even if the subscriber session is on a low-speed channel, if all the other breakout criteria are satisfied, breakout of the low-speed channel may be performed at MIOP@RNC 220. The mobile data network 200 thus provides great flexibility in determining when to do breakout and where.

Referring back to FIG. 5, the RNC service mechanism 540 provides one or more services for the mobile data network. RNC service mechanism 540 is the second of three service mechanisms in the MIOP components. The RNC service mechanism 540 may include any suitable service for the mobile data network, including without limitation caching of data, data or video compression techniques, push-based services, charging, application serving, analytics, security, data filtering, new revenue-producing services, etc.

While the breakout mechanism 510 and RNC service mechanism 540 are shown as separate entities in FIG. 5, the second service mechanism could include both breakout mechanism 510 and RNC service mechanism 540. The overlay network mechanism 550 is similar to the overlay network mechanism 440 in FIG. 4, providing a logical network connection to the other MIOP components on the overlay network 250 in FIG. 2. MIOP@RNC 220 also includes business intelligence 560, which includes:
 1) historical subscriber information received from the mobile data network over time, such as mobility and location, volumes, traffic types, equipment used, etc.
 2) network awareness, including NodeB load states, service area code, channel type, number of times channel type switching occurred for a PDP session, serving cell ID, how many cells and their IDs are in the active set, PDP context type, PDP sessions per subscriber, session duration, data consumption, list of Uniform Resource Locators (URLs) browsed for user classification, top URL browsed, first time or repeat user, entry point/referral URLs for a given site, session tracking, etc.
 3) association of flow control procedures between NodeB and RNC to subscribers.

The business intelligence 560 may be instrumented by the RNC service mechanism 540 to determine when and what types of MIOP services to perform for a given subscriber. For example, services for a subscriber on a mobile phone may differ when compared to services for a subscriber using a laptop computer to access the mobile data network. In another example, voice over internet protocol (VOIP) session could have the data broken out.

Figure 6:
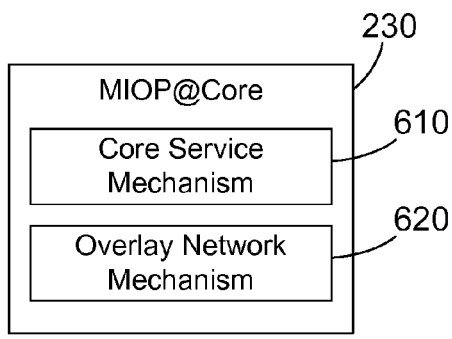
FIG. 6 is a block diagram of the MIOP@Core shown in FIG. 2, which includes a third service mechanism.

Referring to FIG. 6, the MIOP@Core 230 includes a core service mechanism 610 and an overlay network mechanism 620. Core service mechanism 610 provides one or more services for the mobile data network. Core service mechanism 610 is the third of three service mechanisms in the MIOP components. The core service mechanism 610 may include any suitable service for the mobile data network, including without limitation caching of data, data or video compression techniques, push-based services, charging, application serving, analytics, security, data filtering, new revenue-producing services, etc. In one specific implementation, the MIOP@Core 230 is an optional component, because all needed services could be performed at MIOP@NodeB 210 and MIOP@RNC 220. In an alternative implementation, MIOP@Core 230 performs some services, while MIOP@RNC performs others or none. The overlay network mechanism 620 is similar to the overlay network mechanisms 440 in FIG. 4 and 550 in FIG. 5, providing a logical network connection to the other MIOP components on the overlay network 250 in FIG. 2.

Figure 7:
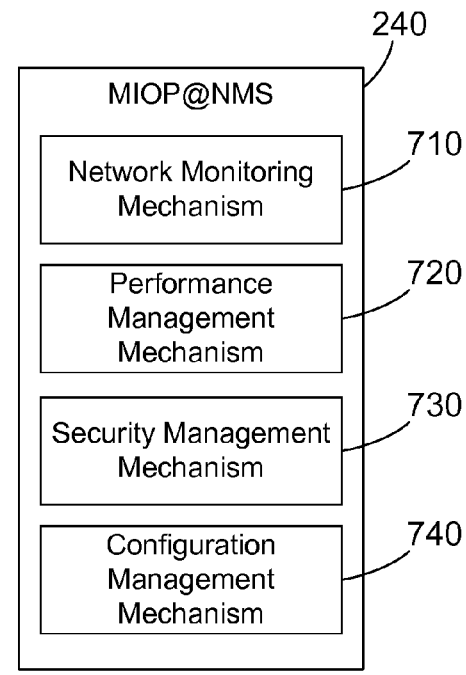
FIG. 7 is a block diagram of a management mechanism coupled to the overlay network that manages the functions of MIOP@NodeB, MIOP@RNC, and MIOP@Core.

Referring to FIG. 7, the MIOP@NMS 240 is a network management system that monitors and manages performance of the mobile data network 200, and controls the function of MIOP@NodeB 210, MIOP@RNC 220, and MIOP@Core 230. MIOP@NMS 240 preferably includes a network monitoring mechanism 710, a performance management mechanism 720, a security management mechanism 730, and a configuration management mechanism 740. The network monitoring mechanism 710 monitors network conditions, such as alarms, in the mobile data network 200. The performance management mechanism 720 can enable, disable or refine certain services by supporting the execution of services in real-time or near real-time, such as services that gather information to assess customer satisfaction. The security management mechanism 730 manages security issues in the mobile data network, such as intrusion detection or additional data privacy. The configuration management mechanism 740 controls and manages the configuration of MIOP@NodeB 210, MIOP@RNC 220, and MIOP@Core 230 in a way that allows them to dynamically adapt to any suitable criteria, including data received from the network monitoring mechanism, time of day, information received from business intelligence 560, etc.

Figure 9:
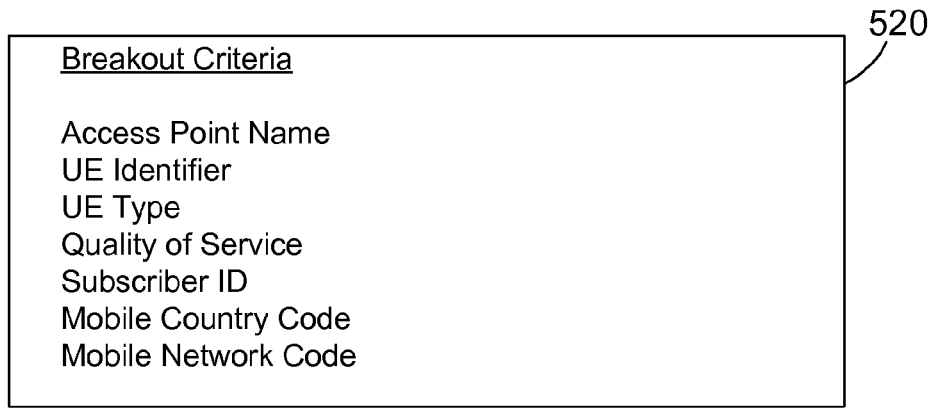
FIG. 9 is a block diagram showing breakout criteria MIOP@RNC may use in making a decision of whether or not to break out data.
Figure 11:
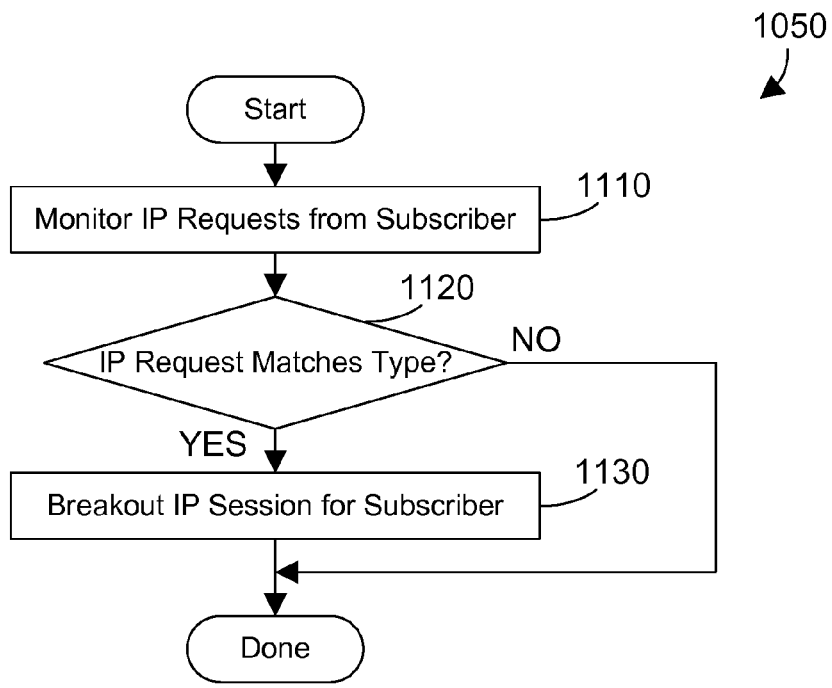
FIG. 11 is a flow diagram of a method for the first service mechanism in MIOP@NodeB to selectively break out data when break out for a specified subscriber session has been authorized.

FIG. 9 shows sample breakout criteria 520 shown in FIG. 5 and used in step 1020 in FIG. 10. Suitable breakout criteria 520 includes access point name, user equipment identifier, user equipment type, quality of service, subscriber ID, mobile country code, and mobile network code. For example, breakout criteria 520 could specify to perform MIOP services for the operator's subscribers, and not to perform MIOP services for roamers. In another example, the breakout criteria 520 could specify to break out only video requests. A static breakout decision will be performed during PDP Context Activation. Based on IP flows (e.g. shallow packet inspection of the IP 5 tuple) only specific IP flows maybe identified and broken out dynamically within that PDP subscriber session (e.g., VoIP traffic), as discussed in more detail below with respect to FIG. 11. Breakout criteria 520 expressly extends to any suitable criteria for making the breakout decision.

Referring again to FIG. 10, when the traffic satisfies the breakout criteria (step 1020=YES), and the subscriber session is registered for breakout (step 1030=YES), MIOP@RNC sends a message to MIOP@NodeB authorizing breakout of traffic for this subscriber session (step 1040). In response, MIOP@NodeB begins decrypting the bearer, examining the signaling and user IP traffic tunneled through it and may breakout the traffic for this subscriber session (step 1050). Note, however, MIOP@NodeB may still decide not to breakout all traffic based on other criteria, such as type of IP request the destination of the traffic or the ISO Layer 7 Application of the decrypted user traffic. Determination of the Application may be performed simply by inspection of the IP 5-tuple or optionally via inspection at layer 7 using Deep Packet Inspection (DPI) techniques. This is shown in the specific example in FIG. 11. Method 1050 in FIG. 10 is one suitable implementation of step 1050 in FIG. 10. MIOP@NodeB monitors IP requests from the subscriber (step 1110). When the user traffic IP request matches a specified type criteria (step 1120=YES), the IP session is broken out for the subscriber (step 1130). When the IP request does not match a specified criteria type (step 1120=NO), no breakout is performed. For example, let's assume that IP requests to access video over the RTP layer 7 Application Protocol are broken out so the video data may be cached in MIOP@NodeB 210, but other requests, such as Google searches, are not. The MIOP@NodeB monitors the IP requests from the subscriber (step 1110), and when the subscriber session IP request carries RTP traffic is for a video file (step 1120=YES), the IP session is broken out (step 1130). Otherwise, the IP session is not broken out at MIOP@NodeB. This is one simple example to illustrate additional flexibility and intelligence within MIOP@NodeB that may determine whether or not to perform breakout for a given subscriber session at the MIOP@NodeB after being authorized by MIOP@RNC to perform breakout for that subscriber session. Any suitable criteria could be used to determine what to breakout and when at MIOP@NodeB once MIOP@NodeB has been authorized for breakout in step 1040 in FIG. 10.

Figure 12:
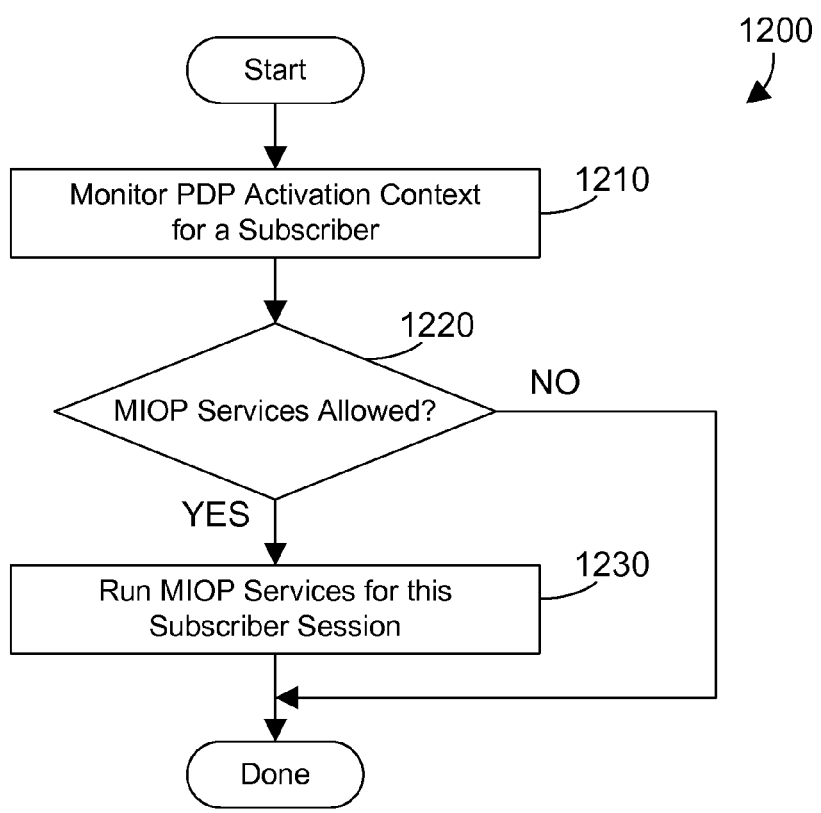
FIG. 12 is a flow diagram of a method for determining when to run MIOP services for a specified subscriber session.

Referring to FIG. 12, method 1200 shows a method for determining when to run MIOP services. The Packet Data Protocol (PDP) activation context for a subscriber is monitored (step 1210). A PDP activation context is established when user equipment 110 connects to tower 120 and the subscriber runs an application that triggers the PDP activation procedure. The core network will determine the subscriber, and perhaps corresponding user equipment. When MIOP services are allowed (step 1220=YES), services for this subscriber session are run (step 1230) upon the arrival of data from the subscriber. When MIOP services are not allowed (step 1220=NO), no MIOP services are run. In one simple example, MIOP services in the mobile data network are allowed for authorized subscribers, but are not allowed for subscribers from a different wireless company that are roaming.

Figure 13:
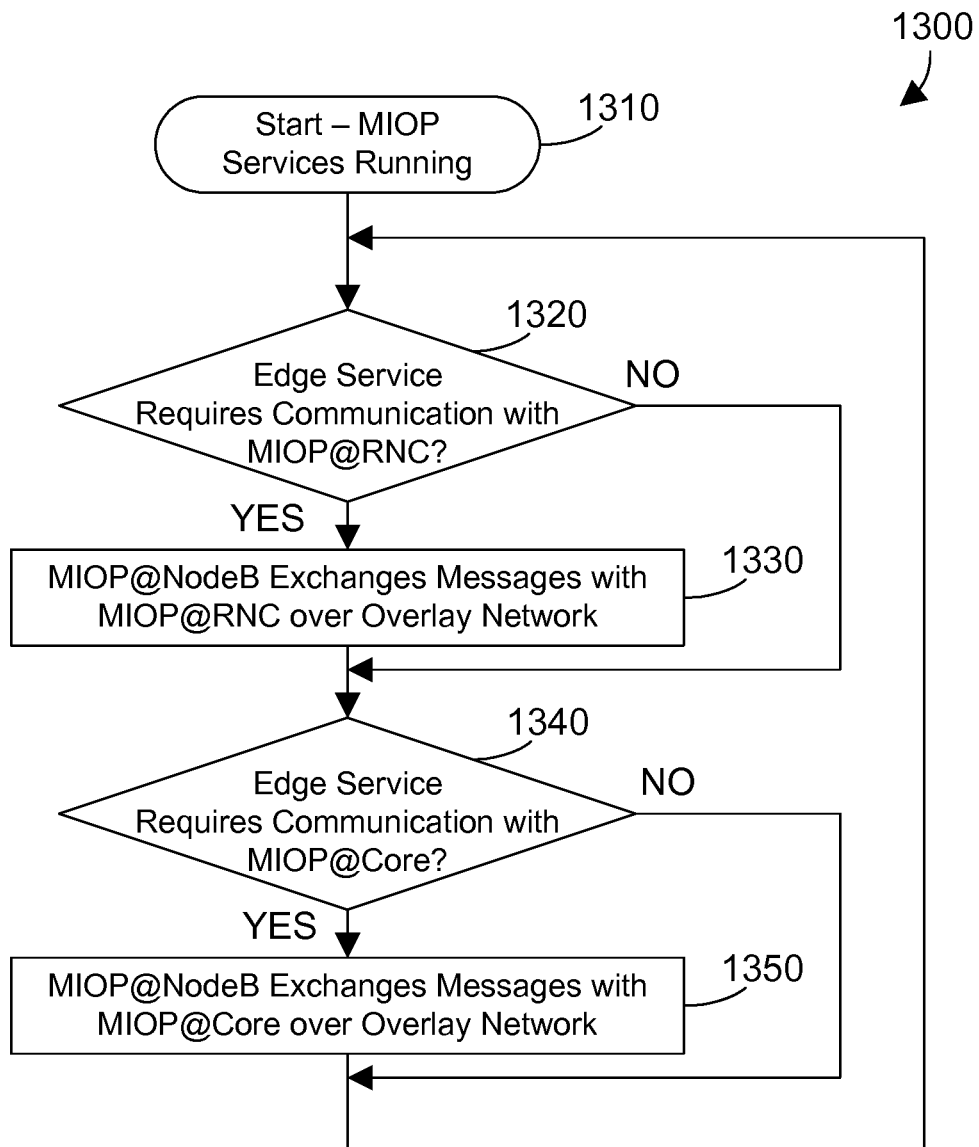
FIGS. 13-15 are flow diagrams that each show communications between MIOP components when MIOP services are running.

MIOP services may require communicating between MIOP components on the overlay network. Referring to FIG. 13, a method 1300 shows communications by MIOP@NodeB when MIOP services are running (step 1310). When the edge service mechanism requires communication with MIOP@RNC (step 1320=YES), MIOP@NodeB exchanges messages with MIOP@RNC over the overlay network (step 1330). When the edge service mechanism requires communication with MIOP@Core (step 1340=YES), MIOP@NodeB exchanges messages with MIOP@Core over the overlay network (step 1350). The overlay network thus allows the various MIOP components to communicate with each other when MIOP services are running.

Figure 14:
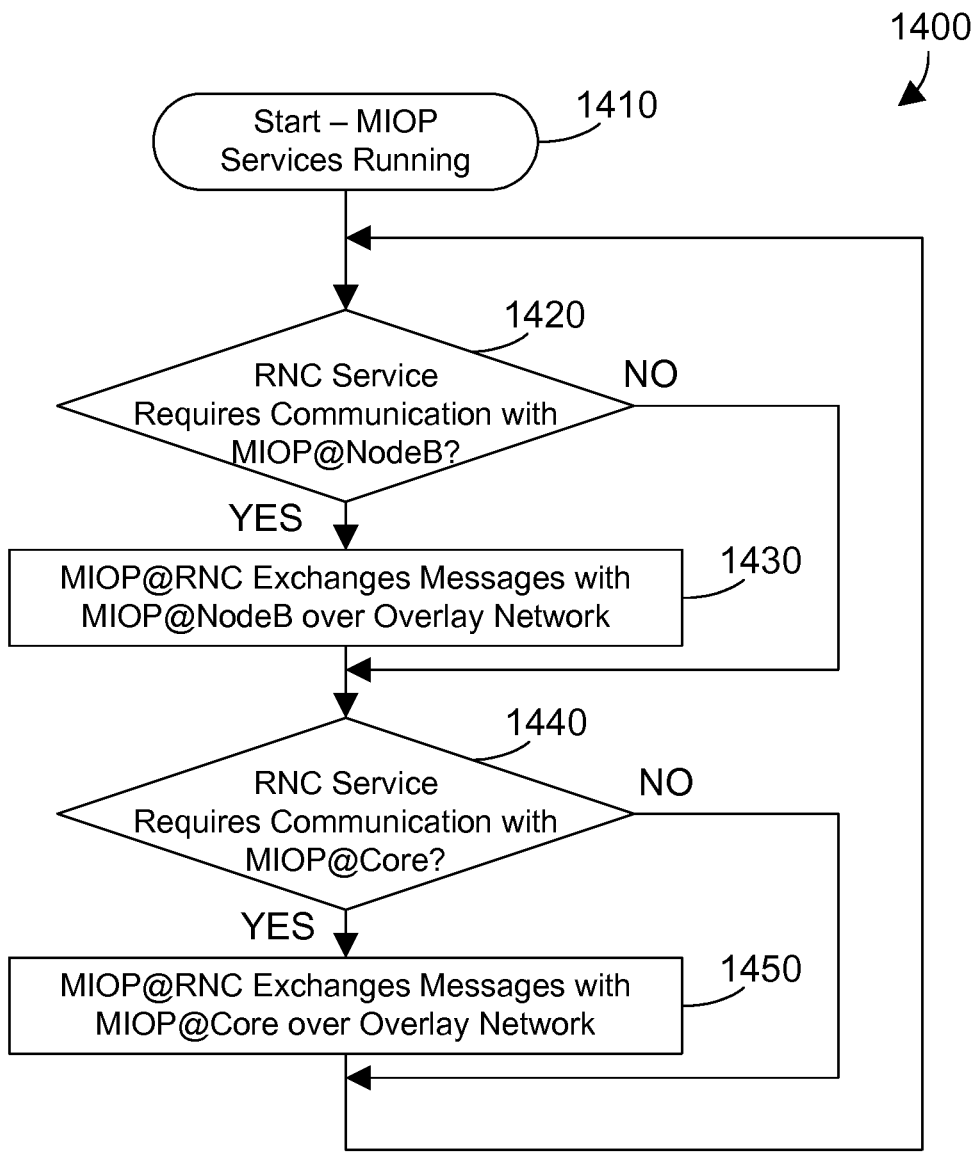

FIG. 14 shows a method 1400 that shows communications by MIOP@RNC when MIOP services are running (step 1410). When the RNC service mechanism requires communication with MIOP@NodeB (step 1420=YES), MIOP@RNC exchanges messages with MIOP@NodeB over the overlay network (step 1430). When the RNC service mechanism requires communication with MIOP@Core (step 1440=YES), MIOP@RNC exchanges messages with MIOP@Core over the overlay network (step 1450).

Figure 15:
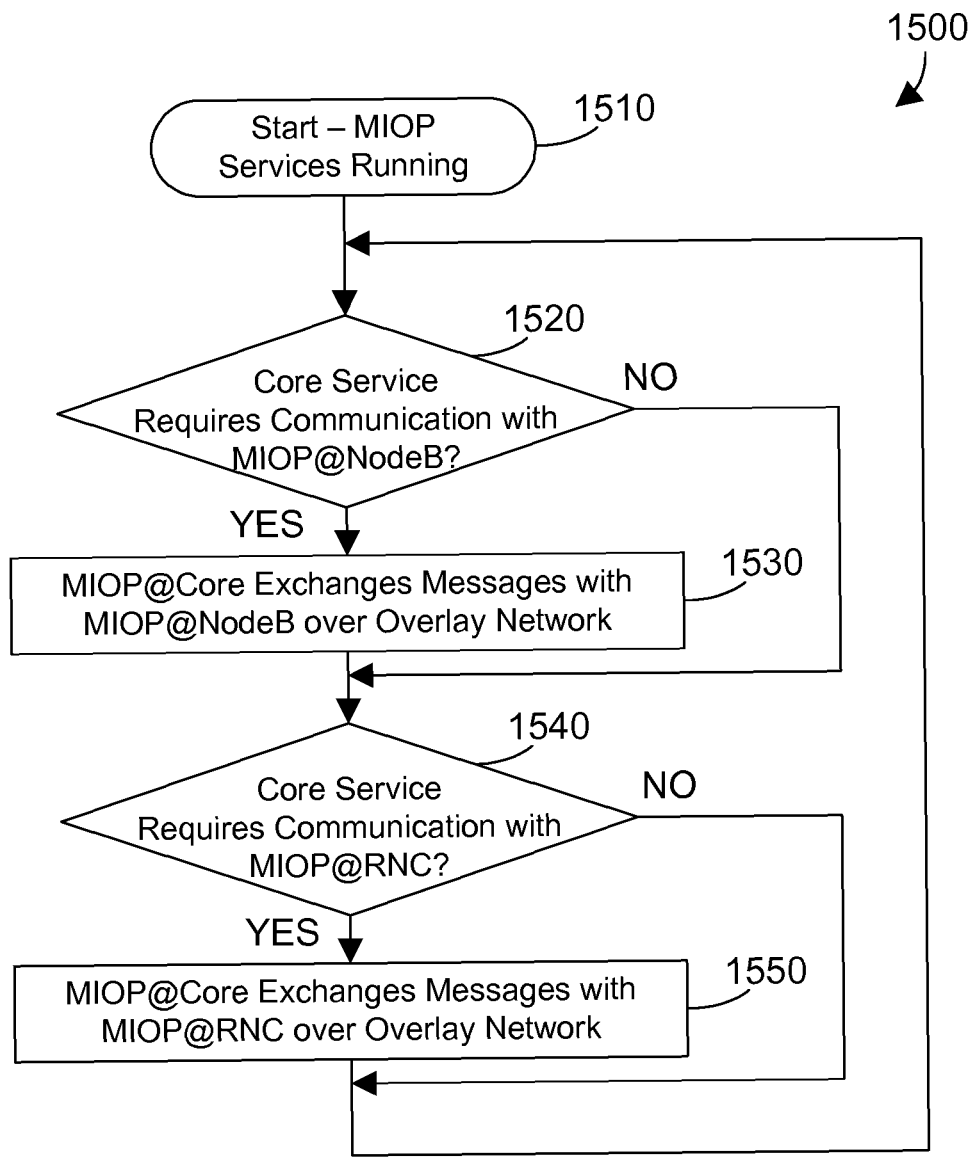

FIG. 15 shows a method 1500 that shows communications by MIOP@Core when MIOP services are running (step 1510). When the core service mechanism requires communication with MIOP@NodeB (step 1520=YES), MIOP@Core exchanges messages with MIOP@NodeB over the overlay network (step 1530) relayed via MIOP@RNC. When the core service mechanism requires communication with MIOP@RNC (step 1540=YES), MIOP@Core exchanges messages with MIOP@RNC over the overlay network (step 1550).

Figure 16:
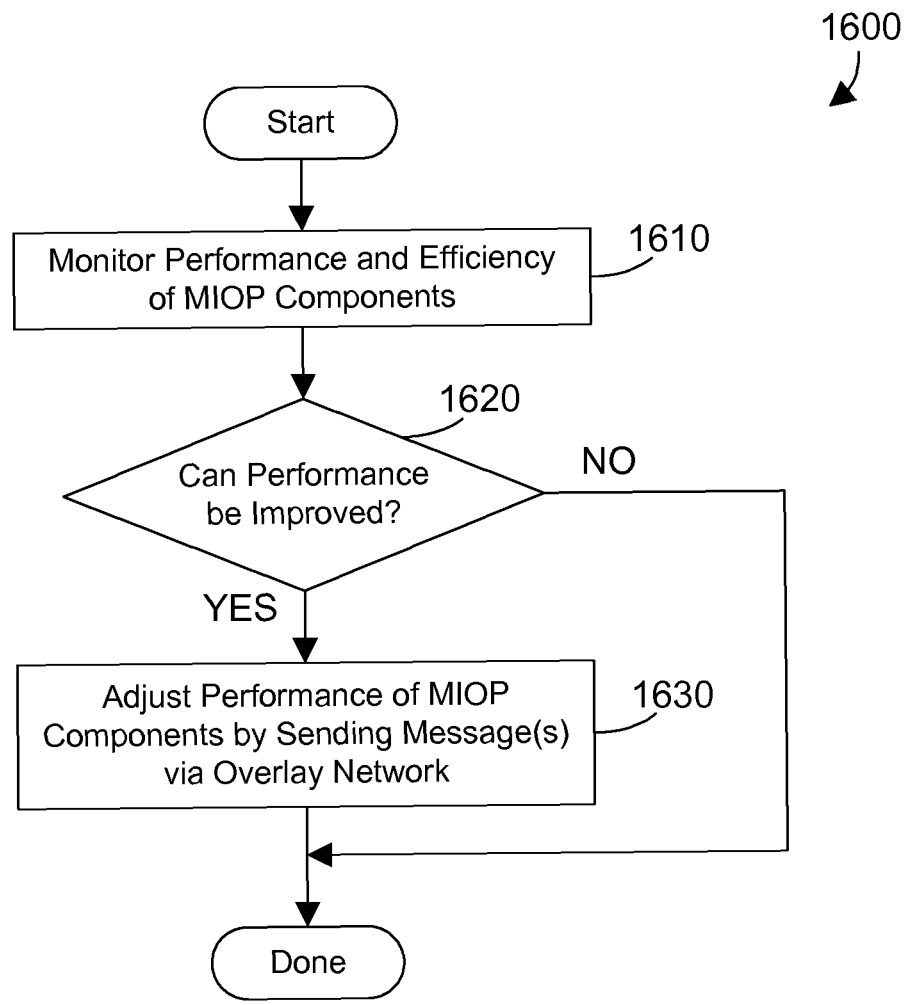
FIG. 16 is a flow diagram of a method for managing and adjusting the MIOP components.

FIG. 16 shows a method 1600 that is preferably performed by MIOP@NMS 240 in FIGS. 2 and 7. The performance and efficiency of the MIOP components that perform MIOP services are monitored (step 1610). The MIOP components that perform MIOP services may include MIOP@NodeB 210, MIOP@RNC 220, and MIOP@Core 230, assuming all of these components are present in the mobile data network 200. When performance may be improved (step 1620=YES), the performance of the MIOP components is adjusted (if implemented and applicable) by sending one or more network messages via the overlay network (step 1630). Note also a human operator could also manually reconfigure the MIOP components to be more efficient.

Figure 17:
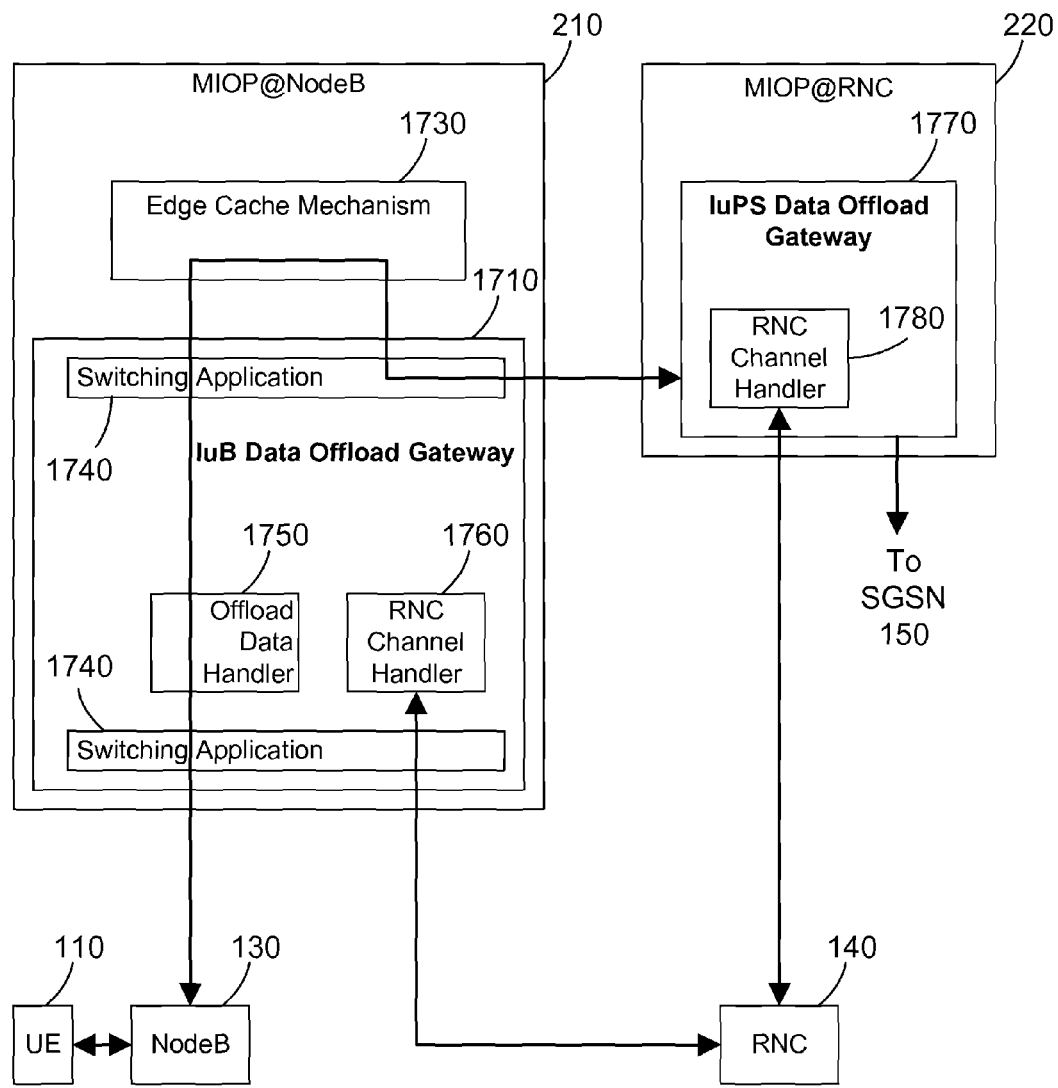
FIG. 17 is a block diagram of one specific implementation for MIOP@NodeB and MIOP@RNC.

Referring to FIG. 17, implementations for MIOP@NodeB 210 and MIOP@RNC 220 are shown by way of example. Other implementations are possible within the scope of the disclosure and claims herein. User equipment 110 is connected to NodeB 130. Note the antenna 120 shown in FIG. 2 is not shown in FIG. 17, but is understood to be present to enable the communication between user equipment 110 and NodeB 130. MIOP@NodeB 210 includes an edge cache mechanism 1730, which is one suitable example of edge service mechanism 430 in FIG. 4. MIOP@NodeB 210 includes an interface referred to herein as IuB Data Offload Gateway (IuB DOGW) 1710. This gateway 1710 implements the breakout mechanism 410 according to one or more specified breakout preconditions 420 shown in FIG. 4. IuB DOGW 1710 includes a switching application 1740, an offload data handler 1750, and an RNC channel handler 1760. The switching application 1740 is responsible for monitoring data packets received from NodeB 130, forwarding the broken out data packets to the offload data handler according to its configuration, and relaying the non-broken out data packets and control system flows to the RNC 140 via the original connections in the RAN. While switching application 1740 is shown as two separate boxes in FIG. 17, this is done to visually indicate the switching application 1740 performs switching on two different interfaces, the network interface and overlay network interface, but the switching application 1740 is preferably a single entity.

When a breakout decision is made and MIOP@RNC 220 sends a message to MIOP@NodeB 210 authorizing breakout (see step 1040 in FIG. 10), when MIOP@NodeB decides to breakout specified user data, the specified user data received by the switching application 1740 from NodeB 130 is broken out, which means the switching application 1740 routes the specified user data to the offload data handler 1750 so the broken out data is routed to the data path defined for breakout data. The offload data handler 1750 may send the data to the edge cache mechanism 1730 for processing, which can route the data directly to MIOP@RNC 220 via the overlay network, as shown by the path with arrows going from NodeB 130 to MIOP@RNC 220.

User data that is not broken out and signaling traffic is routed directly back by the switching application 1740 to RNC. In this manner, non-broken out data and signaling traffic passes through the IuB DOGW 1710 to RNC 140, while broken out data is routed by the IuB DOGW 1710 to a different destination. Note that edge cache mechanism 1730 may send messages to MIOP@RNC 220 as shown in FIG. 17, but the broken out messages themselves are not sent to MIOP@RNC 220.

MIOP@RNC 220 includes an interface referred to herein as IuPS data offload gateway (IuPS DOGW) 1770. IuPS DOGW 1770 forwards all signaling and non-broken out data traffic from RNC 140 to SGSN 150 via the GTP tunnel. IuPS DOGW 1770 includes the breakout mechanism 510, breakout criteria 520 and subscriber registration mechanism 530 shown in FIG. 5 and discussed above with reference to FIG. 5. IuPS DOGW 1770 may exchange messages with IuB DOGW 1710 via the overlay network to perform any needed service in MIOP@NodeB 210 or MIOP@RNC 220. For the specific implementation shown in FIG. 17, while the IuPS DOGW 1770 in MIOP@RNC 220 does not include an offload data handler, the IuPS DOGW 1770 could include an offload data handler and switching application similar to those shown in MIOP@NodeB 210 when MIOP@RNC 220 also needs to perform breakout of data.

The IuPS DOGW 1770 includes an RNC channel handler 1780. The RNC channel handlers 1760 in MIOP@NodeB 210 and 1780 in MIOP@RNC 220 monitor data traffic to and from RNC 140 related to a broken out subscriber session and provide a keep-alive channel maintenance mechanism.

Specific methods are shown in FIGS. 18-21 that illustrate how the specific implementation in FIG. 17 could be used.

Figure 18:
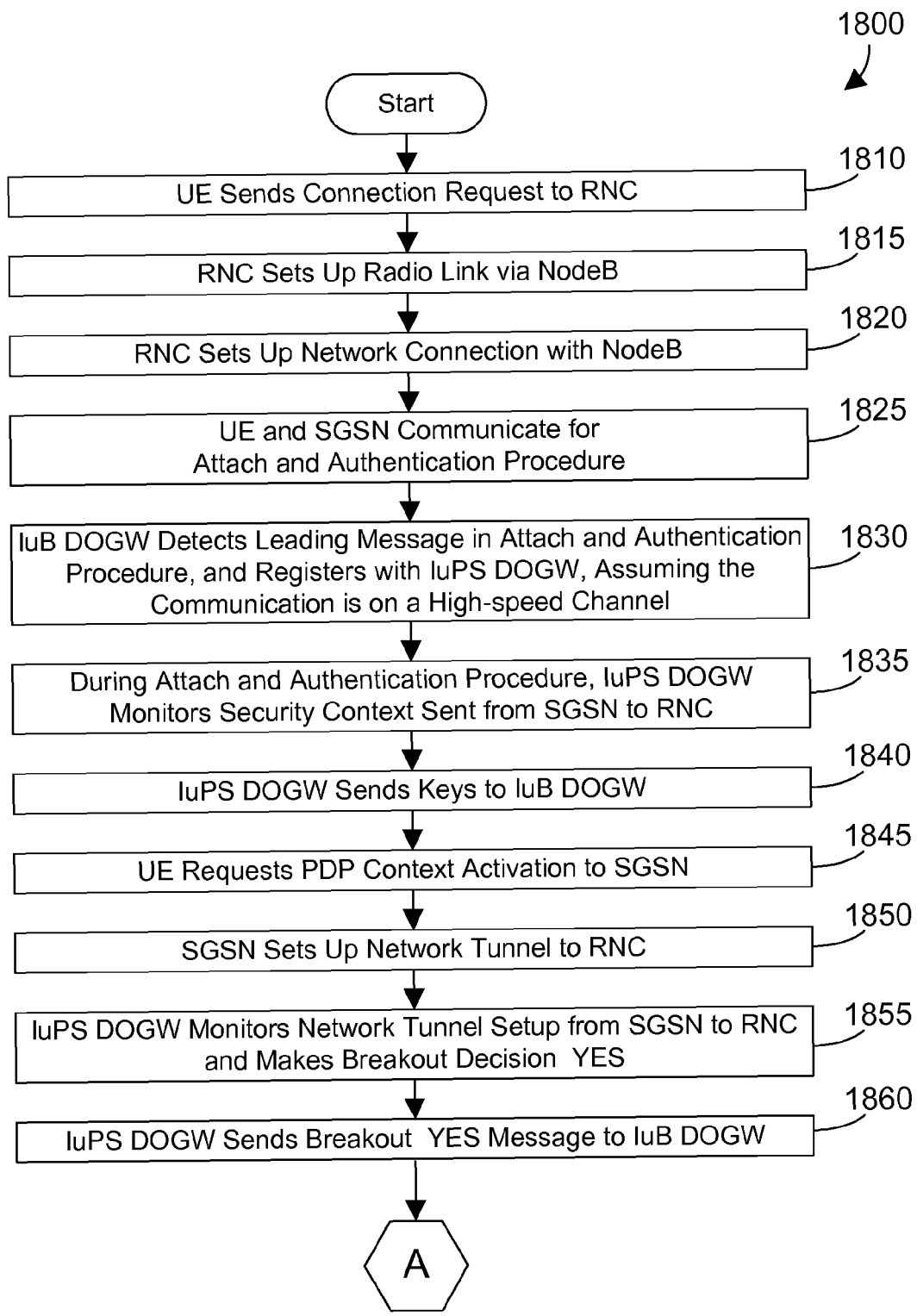
FIGS. 18 and 19 show a flow diagram of a first method for the specific implementation shown in FIG. 17.
Figure 19:
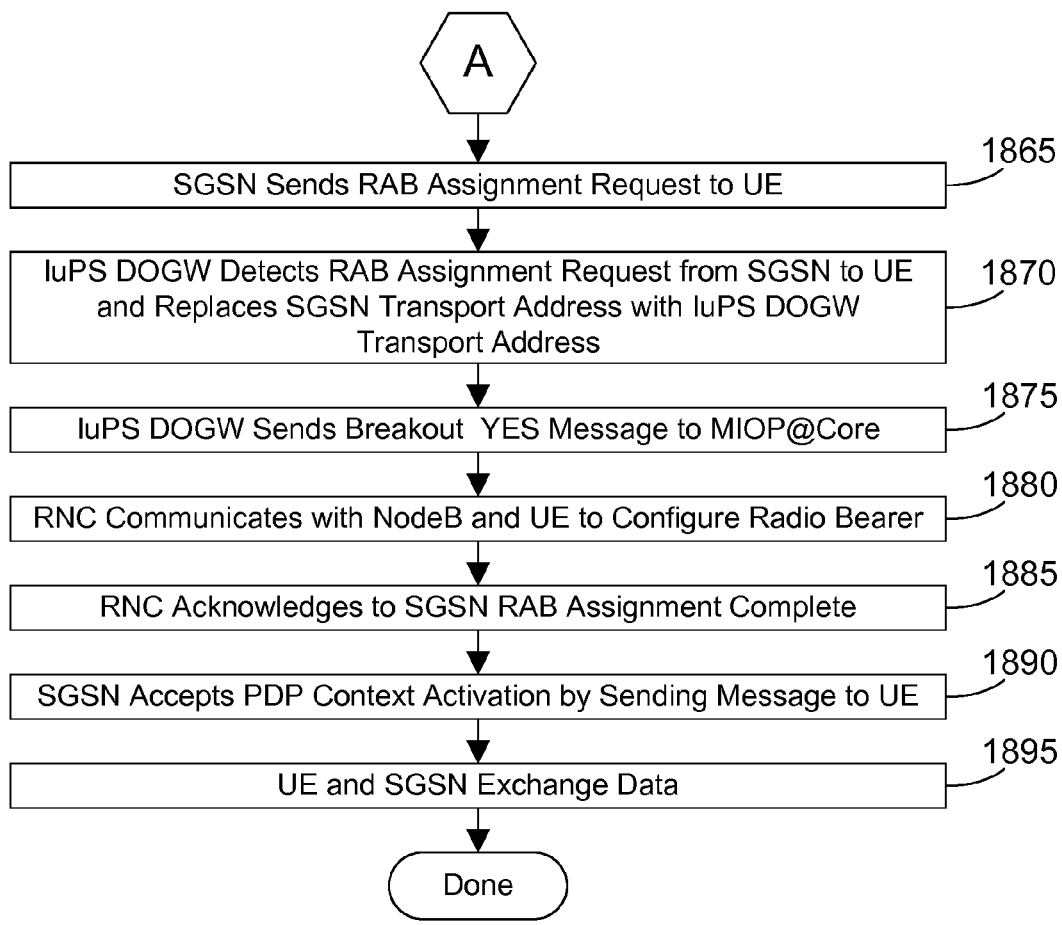

FIGS. 18 and 19 show a method 1800 for setting up breakout of data. The UE sends a connection request to the RNC (step 1810). The RNC sets up a radio link via NodeB (step 1815). The RNC then sets up a network connection with NodeB (step 1820). The UE and SGSN then communicate for the attach and authentication procedure (step 1825). IuB DOGW detects the leading message in the attach and authentication procedure, and registers the subscriber session with IuPS DOGW when preconditions are fulfilled (e.g. UE is capable to carry high speed traffic) (step 1830). During the attach and authentication procedure, IuPS DOGW monitors the security context sent from SGSN to RNC (step 1835). IuPS DOGW then sends keys to IuB DOGW (step 1840). These keys are needed to decipher (decrypt) the upcoming signaling and uplink user data and to cipher (encrypt) the downlink user data. UE then requests PDP context activation to SGSN (step 1845). In response, SGSN sets up a network tunnel to RNC (step 1850). IuPS DOGW monitors network tunnel setup from SGSN to RNC and makes a decision breakout=YES (step 1855). IuPS DOGW sends a message to IuB DOGW indicating breakout=YES (step 1860). Continuing on FIG. 19, SGSN sends an RAB assignment request to UE (step 1865). IuPS DOGW detects the RAB assignment request from SGSN to UE and replaces the SGSN transport address with IuPS DOGW transport address (step 1870). IuPS DOGW sends a message to MIOP@Core indicating breakout=YES (step 1875). RNC communicates with NodeB and UE to (re) configure signaling and data radio bearer (step 1880). RNC acknowledges to SGSN when RAB assignment is complete (step 1885). SGSN accepts PDP context activation by sending a message to UE (step 1890). UE and SGSN may then exchange data for the PDP context (step 1895).

Figure 20:
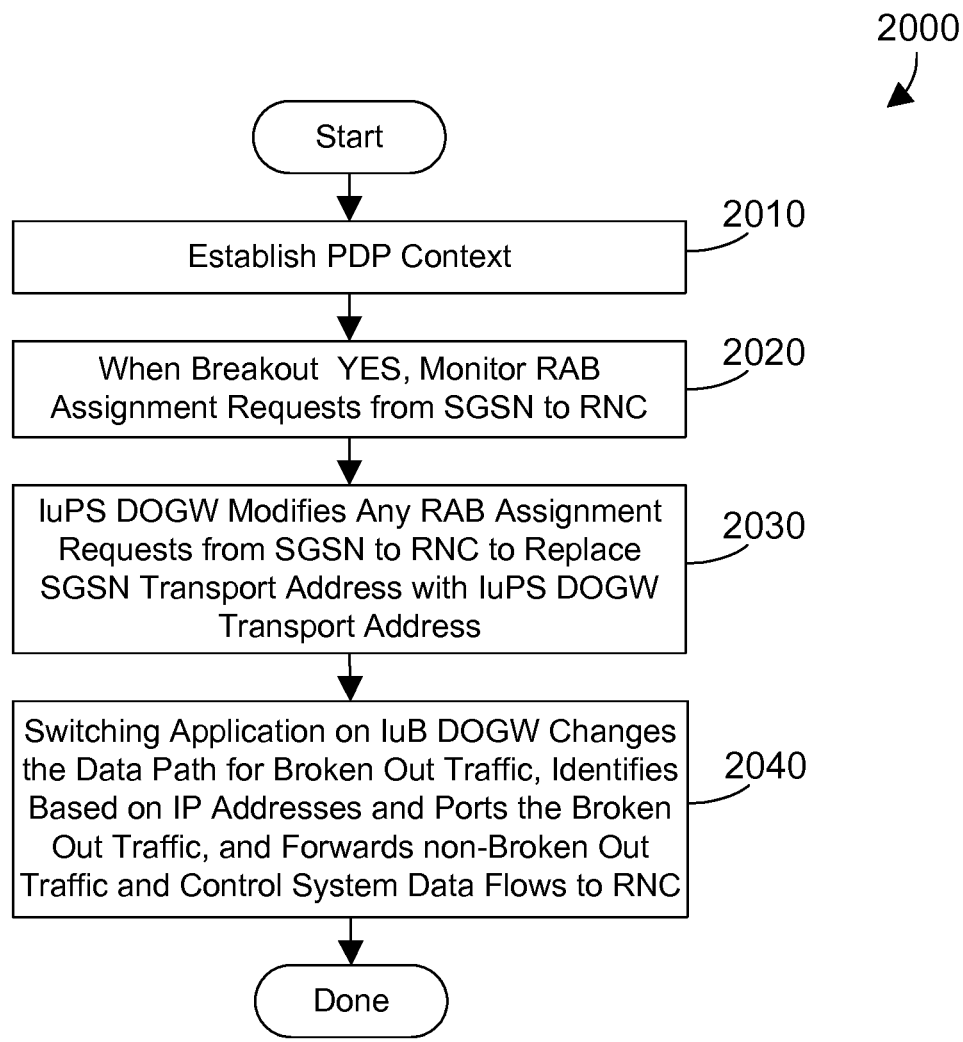
FIG. 20 is a flow diagram of a second method for the specific implementation shown in FIG. 17.

Referring to FIG. 20, a method 2000 begins by establishing a PDP context (step 2010). Method 1800 in FIGS. 18 and 19 include the detailed steps for establishing a PDP context. When breakout=YES, RAB assignment requests from SGSN to RNC are monitored by IuPS DOGW (step 2020). IuPS DOGW modifies any RAB assignment requests from SGSN to RNC to replace the SGSN transport address in the RAB assignment request with the IuPS DOGW transport address (step 2030) in case of matching breakout criteria during PDP context activation procedure. The switching application on IuB DOGW is configured upon the RAN transport layer setup to identify based on IP addresses and ports the broken out traffic and forwards this traffic to the Offload data handler 1765, and forwards non-broken out traffic and control system data flows to the RNC (step 2040).

Figure 21:
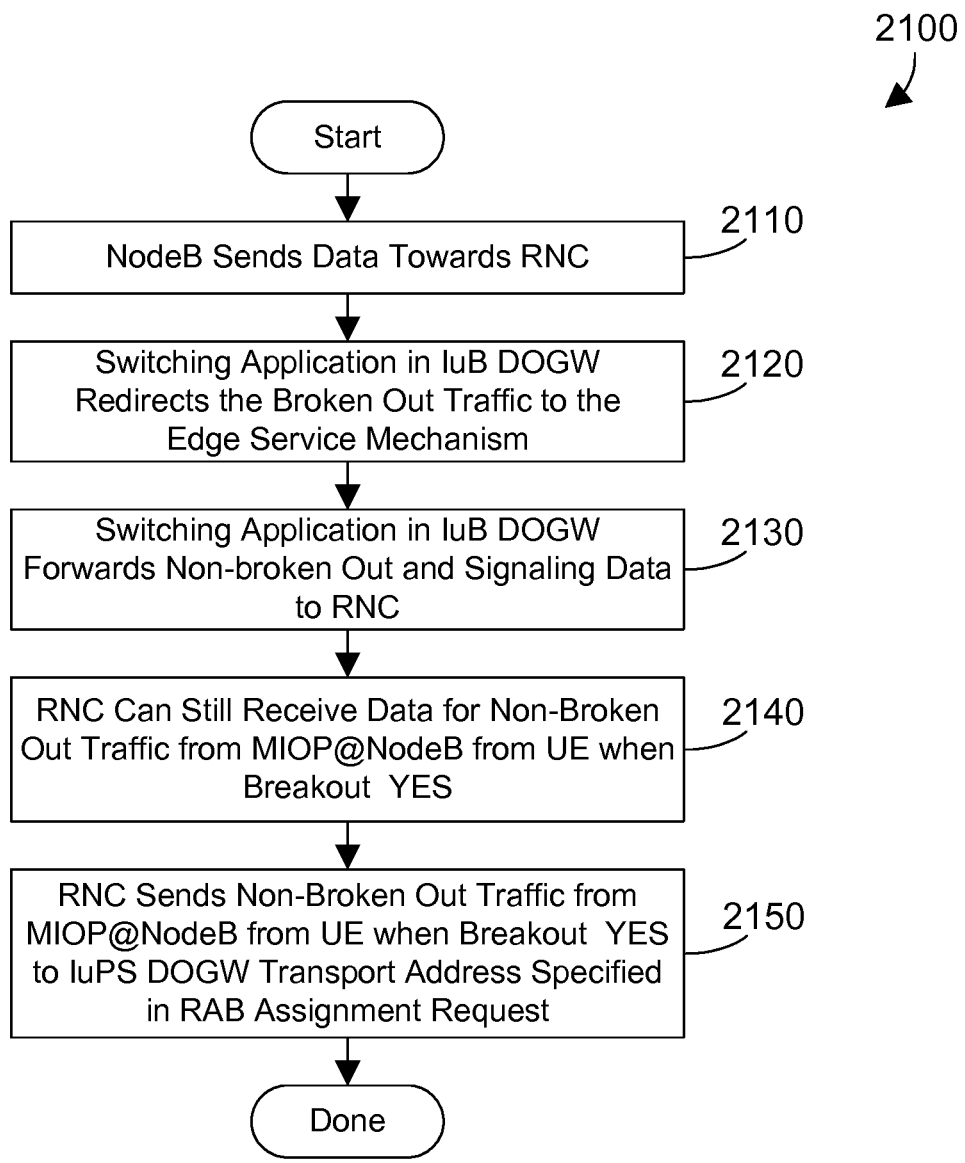
FIG. 21 is a flow diagram of a third method for the specific implementation shown in FIG. 17.

Referring to FIG. 21, a method 2100 begins when NodeB sends data towards RNC (step 2110). The switching application in IuB DOGW redirects the broken out traffic to the edge service mechanism (step 2120), such as edge cache mechanism 1730 in FIG. 17. The switching application also forwards non-broken out data and signaling data to the RNC (step 2130) via the original RAN connections. The RNC can still receive data for non-broken out traffic from MIOP@NodeB when breakout=YES (step 2140). The RNC then sends non-broken out traffic from MIOP@NodeB from UE when breakout=YES to IuPS DOGW transport address specified in RAB assignment request (step 2150).

Figure 22:
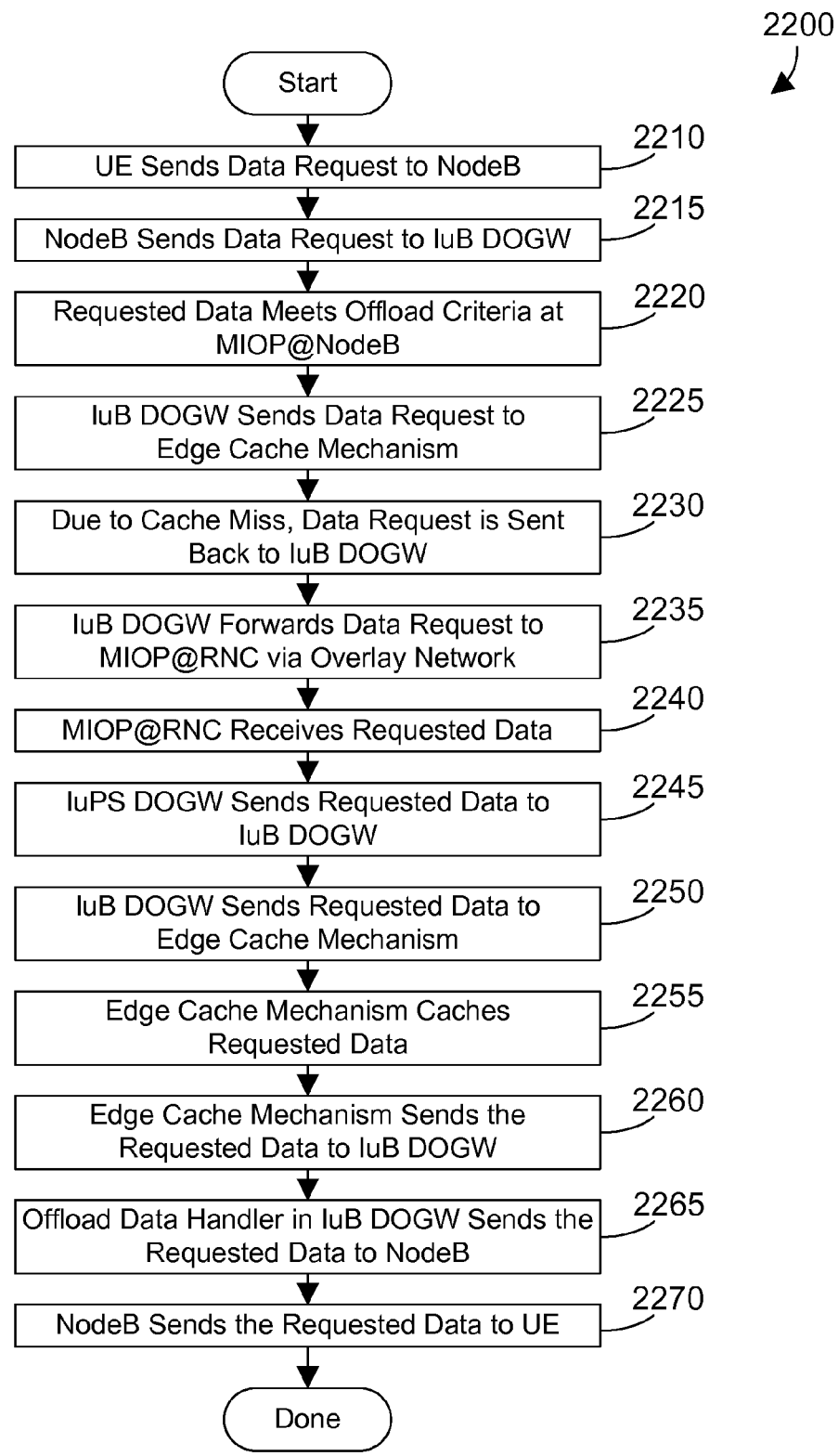
FIG. 22 is a flow diagram of a method for the specific implementation shown in FIG. 17 to process a data request that results in a cache miss at MIOP@NodeB.

A simple example is now provided for the specific implementation in FIG. 17 to show how data can be cached and delivered by MIOP@NodeB 210. Referring to FIG. 22, method 2200 represents steps performed in the implementation in FIG. 17 for a cache miss. UE sends a data request to NodeB (step 2210). NodeB sends the data request to IuB DOGW (step 2215). We assume the requested data meets the offload criteria at MIOP@NodeB (step 2220), which means MIOP@NodeB has been authorized to perform breakout and has determined this requested data should be broken out. IuB DOGW sends the data request to the edge cache mechanism (step 2225). We assume the data is not present in the edge cache mechanism, so due to the cache miss, the edge cache mechanism sends the data request back to IuB DOGW (step 2230). IuB DOGW then forwards the data request to MIOP@RNC via the overlay network (step 2235). In the worst case the content is not cached on MIOP@RNC or MIOP@Core, MIOP@RNC routes the data request to via the overlay network to the MIOP@Core, which passes the data request up the line to the internet, which delivers the requested data to MIOP@Core, which delivers the requested data via the overlay network to MIOP@RNC (step 2240). IuPS DOGW then sends the requested data to IuB DOGW (step 2245). IuB DOGW then sends the requested data to the edge cache mechanism (step 2250). The edge cache mechanism caches the requested data (step 2255). The edge cache mechanism sends the requested data to IuB DOGW (step 2260). The offload data handler in IuB DOGW sends the requested data to NodeB (step 2265). NodeB then sends the requested data to UE (step 2270). At this point, method 2200 is done.

Figure 23:
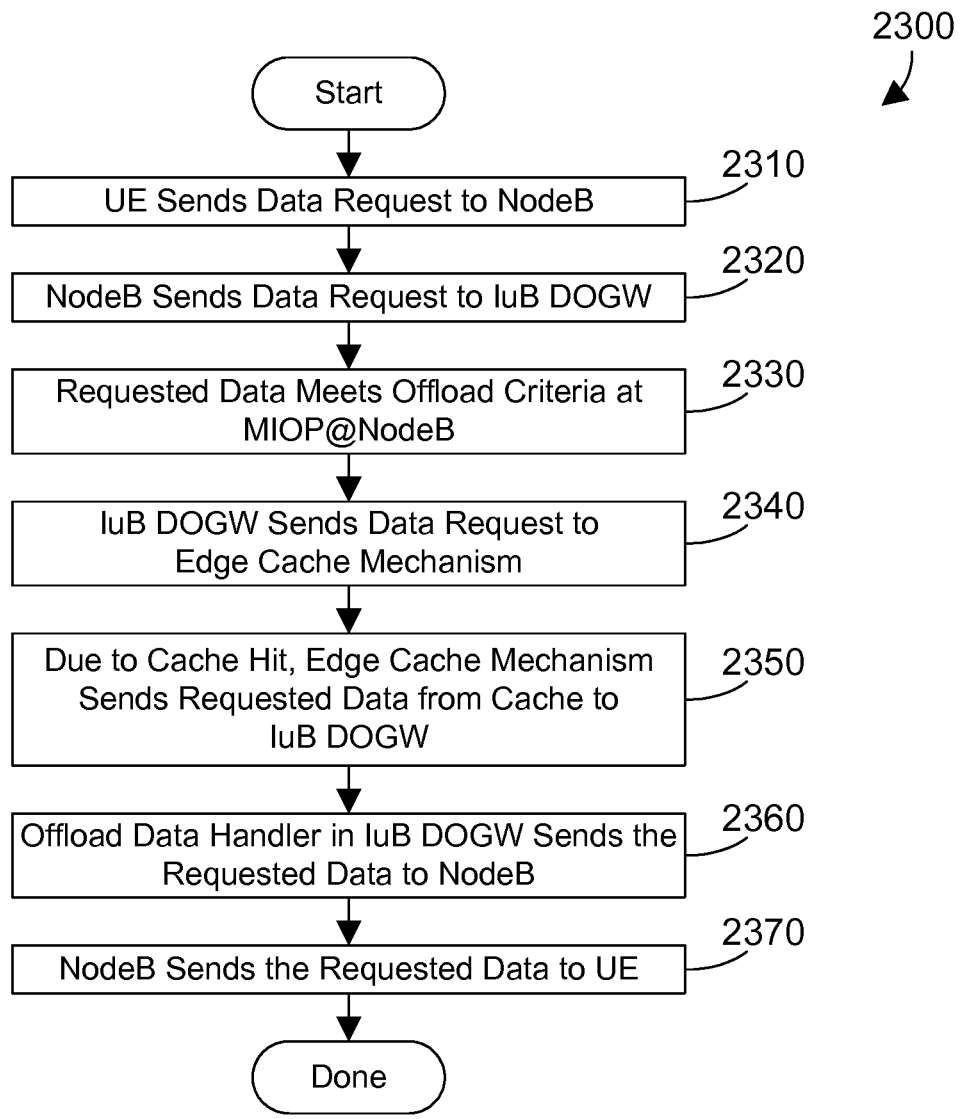
FIG. 23 is a flow diagram of a method for the specific implementation shown in FIG. 17 to process a data request that results in a cache hit at MIOP@NodeB.

Method 2300 in FIG. 23 shows the steps performed for a cache hit in the specific implementation in FIG. 17. The UE sends the data request to NodeB (step 2310). NodeB sends the data request to IuB DOGW (step 2320). The requested data meets the offload criteria at MIOP@NodeB (step 2330). IuB DOGW sends the data request to the edge cache mechanism (step 2340). Due to a cache hit, the edge cache mechanism sends the requested data from the cache to IuB DOGW (step 2350). The offload data handler in IuB DOGW sends the requested data to NodeB (step 2360). Node B then sends the requested data to UE (step 2370). Method 2300 shows a great advantage in caching data at MIOP@NodeB. With data cached at MIOP@NodeB, the data may be delivered to the user equipment without any backhaul on the core network. The result is reduced network congestion in the core network while improving quality of service to the subscriber.

The methods shown in FIGS. 18-23 provide detailed steps for the specific implementation in FIG. 17. Other implementations may have detailed steps that are different than those shown in FIGS. 18-23. These are shown by way of example, and are not limiting of the disclosure and claims herein.

The architecture of the MIOP system allows services to be layered or nested. For example, the MIOP system could determine to do breakout of high-speed channels at MIOP@NodeB, and to do breakout of low-speed channels at MIOP@RNC. In another example, MIOP@NodeB may have a cache, MIOP@RNC may also have a cache, and MIOP@Core may also have a cache. If there is a cache miss at MIOP@NodeB, the cache in MIOP@RNC could be checked, followed by checking the cache in MIOP@Core. Thus, decisions can be dynamically made according to varying conditions of what data to cache and where.

To support the MIOP services that are possible with the mobile data network 200 shown in FIG. 2, the preferred configuration of MIOP@NodeB 210 is a combination of hardware and software. The preferred configuration of MIOP@RNC 220 is also a combination of hardware and software. The preferred configuration of MIOP@Core 230 is software only, and can be run on any suitable hardware in the core network. The preferred configuration of MIOP@NMS 240 is software only, and can also be run on any suitable hardware in the core network.

In the most preferred implementation, the various functions of MIOP@NodeB 210, MIOP@RNC 220, MIOP@Core 230, and MIOP@NMS 240 are performed in a manner that is nearly transparent to existing equipment in the mobile data network. Thus, the components in prior art mobile data network 100 that are also shown in the mobile data network 200 in FIG. 2 have no knowledge of the existence of the various MIOP components, with the exception of existing routers that may need to be updated with routing entries corresponding to the MIOP components. The MIOP services are provided by the MIOP components in a way that requires no changes to hardware and only minor changes to software (i.e., new router entries) in any existing equipment in the mobile data network, thereby making the operation of the MIOP components transparent to the existing equipment once the MIOP components are installed and configured. The result is a system for upgrading existing mobile data networks as shown in FIG. 1 in a way that does not require extensive hardware or software changes to the existing equipment. The MIOP services herein can thus be performed without requiring significant capital expenditures to replace or reprogram existing equipment.

Figure 24:
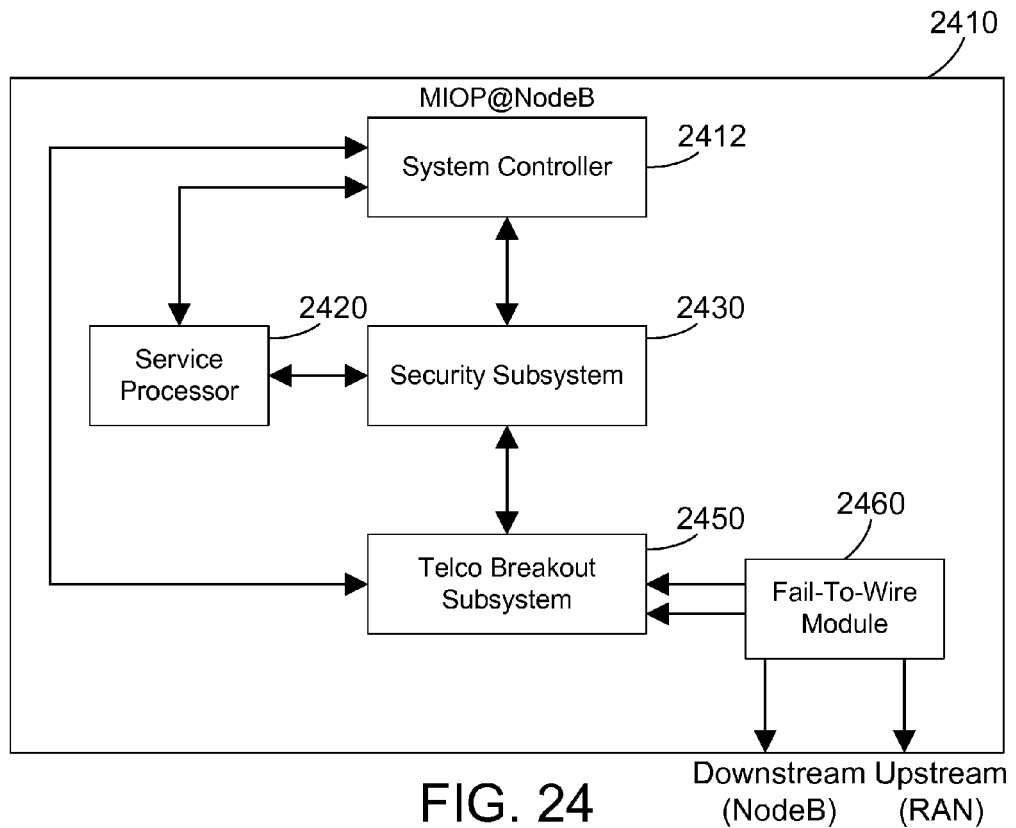
FIG. 24 is a block diagram of one specific hardware architecture for MIOP@ NodeB.

Referring to FIG. 24, one suitable hardware architecture for MIOP@NodeB 2410 is shown. MIOP@NodeB 2410 is one specific implementation for MIOP@NodeB 210 shown in FIGS. 2, 4 and 17. MIOP@NodeB 2410 is one suitable example of a breakout component that may be incorporated into an existing mobile data network. The specific architecture was developed based on a balance between needed function and cost. The hardware components shown in FIG. 24 may be common off-the-shelf components. They are interconnected and programmed in a way to provided needed function while keeping the cost low by using off-the-shelf components. The hardware components shown in FIG. 24 include a system controller 2412, a service processor 2420, a security subsystem 2430, a telco breakout subsystem 2450, and a fail-to-wire module 2460. In one suitable implementation for MIOP@NodeB 2410 shown in FIG. 24, the system controller 2412 is an x86 system. The service processor 2420 is an IBM Integrated Management Module version 2 (IMMv2). The security subsystem 2430 includes an ATMEL processor and a non-volatile memory such as a battery-backed RAM for holding keys. The telco breakout system 2450 performs the breakout functions for MIOP@NodeB 2410. In this specific implementation, the x86 and IMMv2 are both on a motherboard that includes a Peripheral Component Interconnect Express (PCIe) slot. A riser card plugged into the PCIe slot on the motherboard includes the security subsystem 2430, along with two PCIe slots for the telco breakout system 2450. The telco breakout system 2450 may include a telco card and a breakout card that performs breakout as described in detail above with respect to FIG. 17.

One suitable x86 processor that could serve as system controller 2412 is the Intel Xeon E3-1220 processor. One suitable service processor 2420 is an IBM Renassas SH7757, but other known service processors could be used. One suitable processor for the security subsystem 2430 is an ATMEL processor UC3L064, and one suitable non-volatile memory for the security subsystem 2430 is a DS3645 battery-backed RAM from Maxim. One suitable processor for the telco breakout subsystem 2450 is a Cavium card referred to as Octeon II CN63XX.

Figure 25:
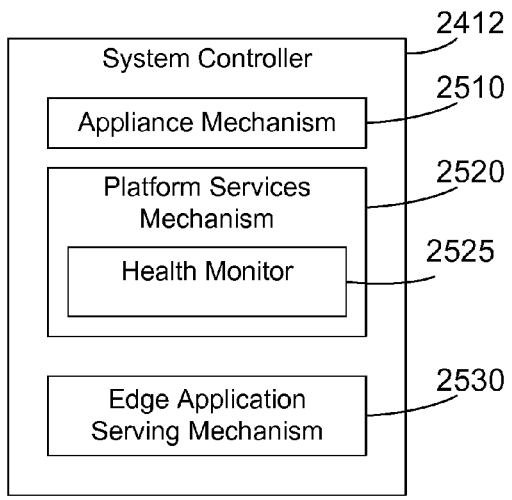
FIG. 25 is a block diagram of the system controller shown in FIG. 24.

Various functions of the MIOP@NodeB 2410 shown in FIG. 24 are divided amongst the different components. Referring to FIG. 25, the system controller 2412 implements an appliance mechanism 2510, a platform services mechanism 2520, and an edge application serving mechanism 2530. The appliance mechanism 2510 provides an interface to MIOP@NodeB that hides the underlying hardware and software architecture by providing an interface that allows configuring and using MIOP@NodeB without knowing the details of the underlying hardware and software. The platform services mechanism 2520 provides messaging support between the components in MIOP@NodeB, allows managing the configuration of the hardware and software in MIOP@NodeB, and monitors the health of the components in MIOP@NodeB with a health monitor 2525 as described further below. The edge application serving mechanism 2530 allows software applications to run within MIOP@NodeB that perform one or more mobile network services at the edge of the mobile data network in response to broken-out data received from user equipment or sent to user equipment. In the most preferred implementation, the data broken out and operated on by MIOP@NodeB is Internet Protocol (IP) data requests received from the user equipment and IP data sent to the user equipment. The edge application service mechanism 2530 may serve both applications provided by the provider of the mobile data network, and may also serve third party applications as well. The edge application serving mechanism 2530 provides a plurality of mobile network services to user equipment at the edge of the mobile data network in a way that is mostly transparent to existing equipment in the mobile data network.

Figure 26:
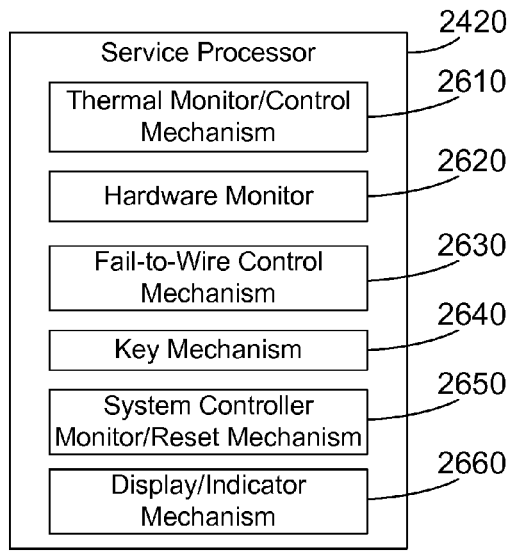
FIG. 26 is a block diagram of the service processor shown in FIG. 24.

Referring to FIG. 26, the service processor 2420 includes a thermal monitor/control mechanism 2610, a hardware monitor 2620, a fail-to-wire control mechanism 2630, a key mechanism 2640, a system controller monitor/reset mechanism 2650, and a display/indicator mechanism 2660. The thermal monitor/control mechanism 2610 monitors temperatures and activates controls to address thermal conditions. For example, the thermal monitor 2610 monitors temperature within the MIOP@NodeB enclosure, and activates one or more fans within the enclosure when the temperature exceeds some threshold. In addition, the thermal monitor/control mechanism 2610 may also monitor temperature in the basestation external to the MIOP@NodeB enclosure, and may control environmental systems that heat and cool the basestation itself external to the MIOP@NodeB enclosure. The hardware monitor 2620 monitors hardware for errors. Examples of hardware that could be monitored with hardware monitor 2620 include CPUs, memory, power supplies, etc. The hardware monitor 2620 could monitor any of the hardware within MIOP@NodeB 2410.

The fail-to-wire control mechanism 2630 is used to switch a fail-to-wire switch to a first operational state when MIOP@NodeB is fully functional that causes data between the upstream computer system and the downstream computer system to be processed by MIOP@NodeB 2410, and to a second failed state that causes data to be passed directly between the upstream computer system and the downstream computer system without being processed by MIOP@NodeB 2410. The key mechanism 2640 provides an interface for accessing the security subsystem 2430. The system controller monitor/reset mechanism 2650 monitors the state of the system controller 2412, and resets the system controller 2412 when needed. The display/indicator mechanism 2660 activates a display and indicators on the front panel of the MIOP@NodeB to provide a visual indication of the status of MIOP@NodeB.

Referring to FIG. 27, the security subsystem 2430 includes a key storage 2702 that is a non-volatile storage for keys, such as a battery-backed RAM. The security subsystem 2430 further includes a key mechanism 2710 and a tamper detection mechanism 2720. Key mechanism 2710 stores keys to the non-volatile key storage 2702 and retrieves keys from the non-volatile key storage 2702. Any suitable keys could be stored in the key storage 2702. The security subsystem 2430 controls access to the keys stored in key storage 2702 using key mechanism 2710. The tamper detection mechanism 2720 detects physical tampering of MIOP@NodeB, and performs functions to protect sensitive information within MIOP@NodeB when physical tampering is detected. The enclosure for MIOP@NodeB includes tamper switches that are triggered if an unauthorized person tries to open the box. In response, the tamper detection mechanism may take any suitable action, including actions to protect sensitive information, such as not allowing MIOP@NodeB to boot the next time, erasing keys in key storage 2702, and actions to sound an alarm that the tampering has occurred.

Referring to FIG. 28, the telco breakout system 2450 includes a telco card 2802, a breakout mechanism 2810, and an overlay network mechanism 2820. Telco card 2802 is any suitable card for handling network communications in the radio access network. Breakout mechanism 2810 is one specific implementation for breakout mechanism 410 shown in FIG. 4. Breakout mechanism 2810 performs the breakout functions as described in detail above. The breakout mechanism 2810 interrupts the connection between the NodeB and the next upstream component in the radio access network, such as the RNC, as shown in FIG. 2. Non-broken out data from the upstream component is simply passed through MIOP@NodeB to the NodeB. Non-broken out data from the NodeB is simply passed through MIOP@NodeB to the upstream component. Note the path for non-broken out data is the traditional path for data in the mobile data network before the MIOP components were added. Broken-out data is intercepted by MIOP@NodeB, and may be appropriate processed at MIOP@NodeB, or may be routed to an upstream component via a different data path, such as to MIOP@RNC via the overlay network. The telco breakout system 2450 includes an overlay network mechanism 2820 that allows MIOP@NodeB 2410 to communicate via the overlay network. For example, MIOP@NodeB 2410 could use overlay network mechanism 2820 to communicate with MIOP@RNC 220 or to communicate with other MIOP@NodeBs.

The edge application mechanism 2530 may provide many different mobile network services. Examples of some of these services are shown in FIG. 29. This specific implementation for edge application mechanism 2530 includes an edge caching mechanism 2910, a push-based service mechanism 2920, a third party edge application serving mechanism 2930, an analytics mechanism 2940, a filtering mechanism 2950, a revenue-producing service mechanism 2960, and a charging mechanism 2970. The edge caching mechanism 2910 is one suitable implementation of edge cache mechanism 1730 shown in FIG. 17, and includes the functions described above with respect to FIG. 17. The push-based service mechanism 2920 provides support for any suitable push-based service, whether currently known or developed in the future. Examples of known push-based services include without limitation incoming text messages, incoming e-mail, instant messaging, peer-to-peer file transfers, etc.

The third party edge application serving mechanism 2930 allows running third party applications that provide mobile network services at the edge of the mobile data network. The capability provided by the third party edge application serving mechanism 2930 opens up new ways to generate revenue in the mobile data network. The operator of the mobile data network may generate revenue both from third parties that offer edge applications and from subscribers who purchase or use edge applications. Third party applications for user equipment has become a very profitable business. By also providing third party applications that can run at the edge of the mobile data network, the experience of the user can be enhanced. For example, face recognition software is very compute-intensive. If the user were to download an application to the user equipment to perform face recognition in digital photographs, the performance of the user equipment could suffer. Instead, the user could subscribe to or purchase a third party application that runs at the edge of the mobile data network (executed by the third party edge application serving mechanism 2930) that performs face recognition. This would allow a subscriber to upload a photo and have the hardware resources in MIOP@NodeB perform the face recognition instead of performing the face recognition on the user equipment. We see from this simple example it is possible to perform a large number of different functions at the edge of the mobile data network that were previously performed in the user equipment or upstream in the mobile data network. By providing applications at the edge of the mobile data network, the quality of service for subscribers increases.

The analytics mechanism 2940 performs analysis of broken-out data. The results of the analysis may be used for any suitable purpose or in any suitable way. For example, the analytics mechanism 2940 could analyze IP traffic on MIOP@NodeB, and use the results of the analysis to more intelligently cache IP data by edge caching mechanism 2910. In addition, the analytics mechanism 2940 makes other revenue-producing services possible. For example, the analytics mechanism 2940 could track IP traffic and provide advertisements targeted to user equipment in a particular geographic area served by the basestation. Because data is being broken out at MIOP@NodeB, the analytics mechanism 2940 may perform any suitable analysis on the broken out data for any suitable purpose.

The filtering mechanism 2950 allows filtering content delivered to the user equipment by MIOP@NodeB. For example, the filtering mechanism 2950 could block access to adult websites by minors. This could be done, for example, via an application on the user equipment or via a third party edge application that would inform MIOP@NodeB of access restrictions, which the filtering mechanism 2950 could enforce. The filtering mechanism 2950 could also filter data delivered to the user equipment based on preferences specified by the user. For example, if the subscriber is an economist and wants news feeds regarding economic issues, and does not want to read news stories relating to elections or politics, the subscriber could specify to exclude all stories that include the word "election" or "politics" in the headline. Of course, many other types of filtering could be performed by the filtering mechanism 2950. The filtering mechanism 2950 preferably performs any suitable data filtering function or functions, whether currently known or developed in the future.

The revenue-producing service mechanism 2960 provides new opportunities for the provider of the mobile data network to generate revenue based on the various functions MIOP@NodeB provides. An example was given above where the analytics mechanism 2940 can perform analysis of data broken out by MIOP@NodeB, and this analysis could be provided by the revenue-producing service mechanism 2960 to interested parties for a price, thereby providing a new way to generate revenue in the mobile data network. Revenue-producing service mechanism 2960 broadly encompasses any way to generate revenue in the mobile data network based on the specific services provided by any of the MIOP components.

The charging mechanism 2970 provides a way for MIOP@NodeB to inform the upstream components in the mobile data network when the subscriber accesses data that should incur a charge. Because data may be provided to the subscriber directly by MIOP@NodeB without that data flowing through the normal channels in the mobile data network, the charging mechanism 2970 provides a way for MIOP@NodeB to charge the subscriber for services provided by MIOP@NodeB of which the core network is not aware. The charging mechanism 2970 tracks the activity of the user that should incur a charge, then informs a charging application in the core network that is responsible for charging the subscriber of the charges that should be billed.

The hardware architecture of MIOP@NodeB shown in FIGS. 24-29 allows MIOP@NodeB to function in a way that is mostly transparent to existing equipment in the mobile data network. For example, if an IP request from user equipment may be satisfied from data held in a cache by edge caching mechanism 2910, the data may be delivered directly to the user equipment by MIOP@NodeB without traversing the entire mobile data network to reach the Internet to retrieve the needed data. This can greatly improve the quality of service for subscribers by performing so many useful functions at the edge of the mobile data network. The core network will have no idea that MIOP@NodeB handled the data request, which means the backhaul on the mobile data network is significantly reduced. The MIOP components disclosed herein thus provide a way to significantly improve performance in a mobile data network by adding the MIOP components to an existing mobile data network without affecting most of the functions that already existed in the mobile data network.

The mobile data network 200 disclosed herein includes MIOP components that provide a variety of different services that are not possible in prior art mobile data network 100. In the most preferred implementation, the MIOP components do not affect voice traffic in the mobile data network. In addition to performing optimizations that will enhance performance in the form of improved download speeds, lower latency for access, or improved quality of experience in viewing multimedia on the mobile data network, the MIOP architecture also provides additional capabilities that may produce new revenue-generating activities for the carrier. For example, analytics may be performed on subscriber sessions that allow targeting specific subscribers with additional services from the carrier to generate additional revenue. For example, subscribers congregating for a live music event may be sent promotions on paid for media related to that event. In another example, subscribers getting off a train may be sent a coupon promoting a particular shuttle company as they walk up the platform towards the street curb. Also, premium web content in the form of video or other multimedia may be served from local storage and the subscriber would pay for the additional content and quality of service.

While the mobile data network in FIG. 2 and discussed herein is in the context of a 3G mobile data network, the disclosure and claims herein expressly extend to other networks as well, including Long Term Evolution (LTE) networks, flat RAN networks, and code division multiple access (CDMA) networks.

Figure 30:
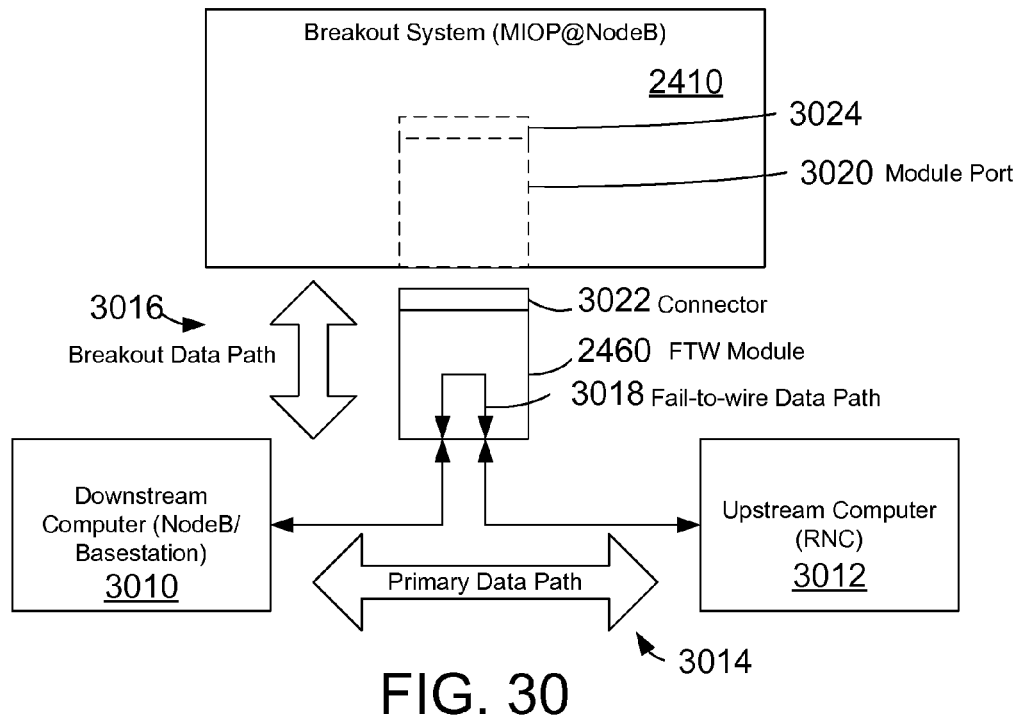
FIG. 30 is a block diagram that illustrates the data paths of the fail-to-wire module when connected to a breakout system between a downstream computer and an upstream computer.

FIG. 30 is a block diagram that illustrates the data paths of the fail-to-wire FTW module 2460. The FTW module 2460 connects a breakout system (MIOP@NodeB) 2410 between a downstream computer 3010 and an upstream computer 3012. In the described example, the downstream computer 3010 is a NodeB 130 or Basestation 222 and the upstream computer 3012 is an RNC 140 in a mobile data network as described above (See FIG. 1). The primary data path 3014 of the system is a network data communication signal between the upstream computer 3012 and the downstream computer 3010. In the specific example described herein, the primary data path 3014 is a voice/data stream connection from the basestation 130 to the backend of a mobile data network. The FTW module 2460 acts to preserve the primary data path if there is a failure in the breakout system 2410 (MIOP@NodeB). The FTW module 2460 provides a breakout data path 3016 that routes data normally on the primary data path 3014 through the MIOP@NodeB 2410. When there is some kind of failure or problem in the MIOP@NodeB 2410 the FTW module 2460 connects the downstream computer 3010 with the upstream computer 3012 through the fail-to-wire data path 3018 on the FTW module that preserves the primary data path. The FTW module 2460 is preferably a removable module with a connector 3022 that connects to an edge card connector 3024 at a module port 3020 in the MIOP@NodeB.

Again referring to FIG. 30, the FTW module allows the breakout system 2410 to move between the primary data path 3014 and the breakout data path 3016. Moving between these two paths requires a temporary interruption of data traffic on the primary data path. This temporary interruption of the data traffic will be simply a small glitch that will normally be compensated for by retransmitting of missed data packets and other failure mechanisms in the mobile data network such that the temporary interruption will not be observable to the human user on the user equipment.

Figure 31:
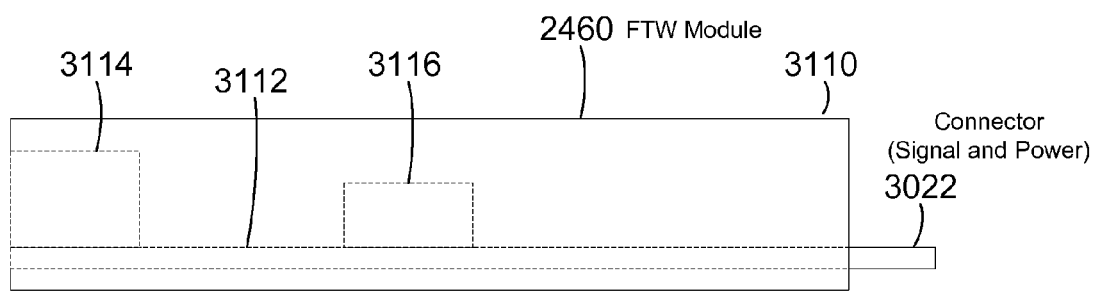
FIG. 31 is a block diagram that illustrates a side view with additional detail of the fail-to-wire module.

FIG. 31 illustrates a side view of the FTW module 2460 introduced above. In the illustrated example, the FTW module 2460 is a metal or plastic housing 3110 with a circuit board 3112. For the illustrated example, the height of the FTW module housing 3110 is preferably less than 1 U to allow two FTW module to be stacked together in a 2 U sized chassis containing the breakout system. The FTW module 2460 further includes a connector 3022 to connect the module into the breakout system server 2410 (MIOP@NodeB) at the module port 3020 as shown in FIG. 30. In this example the connector 3022 is surface connector traces on the circuit board 3112 that connect with the edge card connector 3024 in the module port 3020 (FIG. 30). The FTW module 2460 includes a number of connectors 3114 to connect the network data signals to the upstream and downstream computers. In this side view, only a single connector 3114 is in view. The FTW module 2460 also includes a number of switches 3116 to switch the network data signals. In this side view, only a single switch 3116 is in view. The switches when activated break out the primary data path to route network signals between the downstream computer 3010 and the upstream computer through the breakout system 3012 as described herein.

Figure 32:
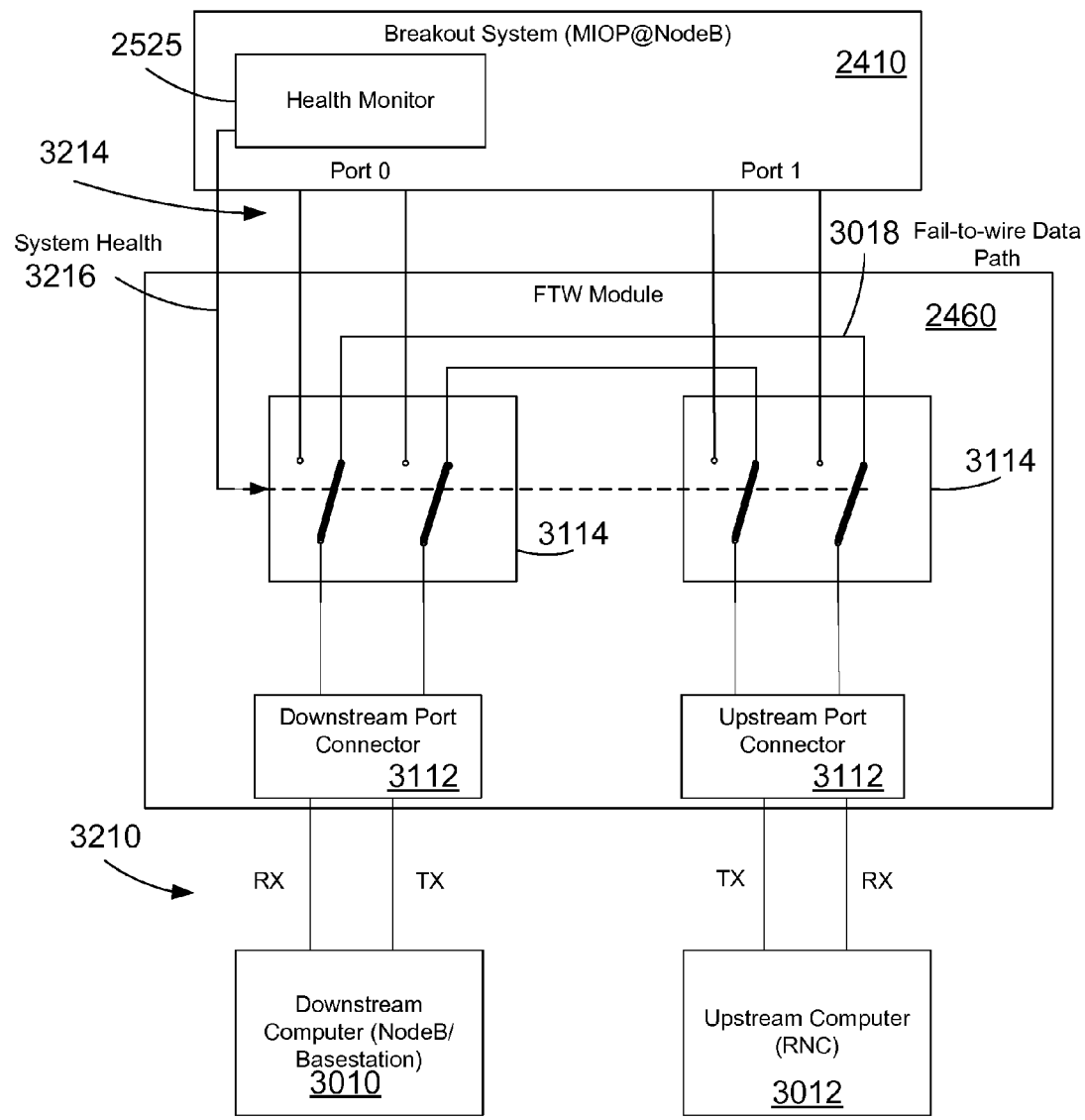
FIG. 32 is a block diagram that illustrates a high level view of the basic operation of the fail-to-wire module.

FIG. 32 is a block diagram that illustrates the basic operation of the fail-to-wire module. The FTW module 2460 operates to connect the breakout system (MIOP@NodeB) 2410 between a downstream computer 3010 and an upstream computer 3012. These connections are made with switches 3114. The switches 3114 in this example are double poll double throw electrically actuated switches such as a relay, electrical solenoid or a reed switch. Alternatively, the switches could also be optical switches for optical network signals. The switches 3114 are connected such that in the non-energized state the upstream and downstream computers are connected through the fail-to-wire path 3018 as shown. This connection insures that if power is lost from the FTW module 2460 then the module will preserve the primary data path shown in FIG. 30. The network data signals 3210 of the upstream computer 3010 and the downstream computer 3012 are connected to the switches 3114 of the FTW module 2460 through connectors 3112. The other output of each of the switches 3114 is connected the breakout system server ports 3214 of the breakout system server (MIOP@NodeB) 2410. In the illustrated example only a single set of switches is shown that operation to switch a single network data signal pair (transmit and receive) from the upstream computer to the downstream computer, however, multiple sets of switches could be configured in a single FTW module to switch multiple network data signal pairs.

Figure 33:
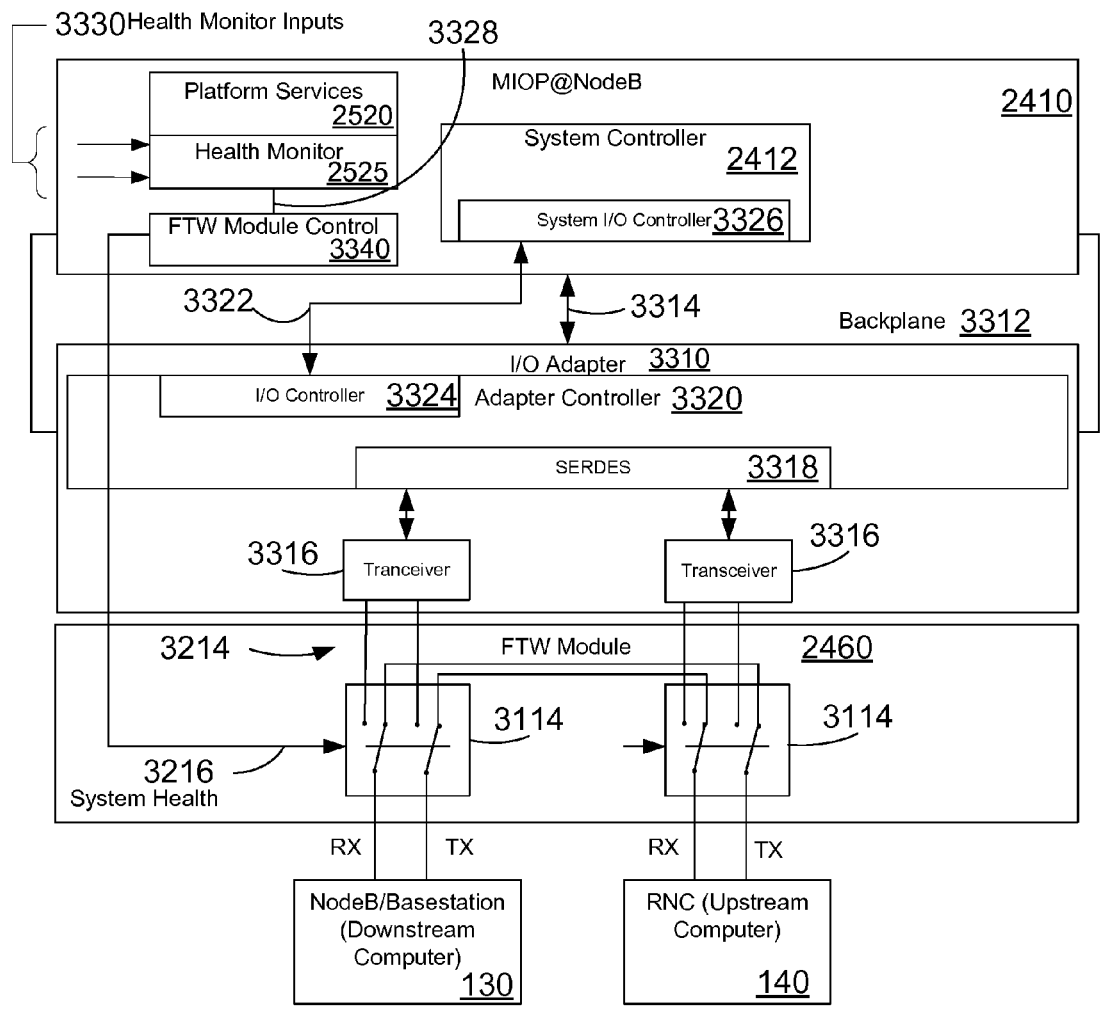
FIG. 33 is a block diagram that illustrates a detailed example of the fail-to-wire module in the mobile data network described herein.
Figure 34:
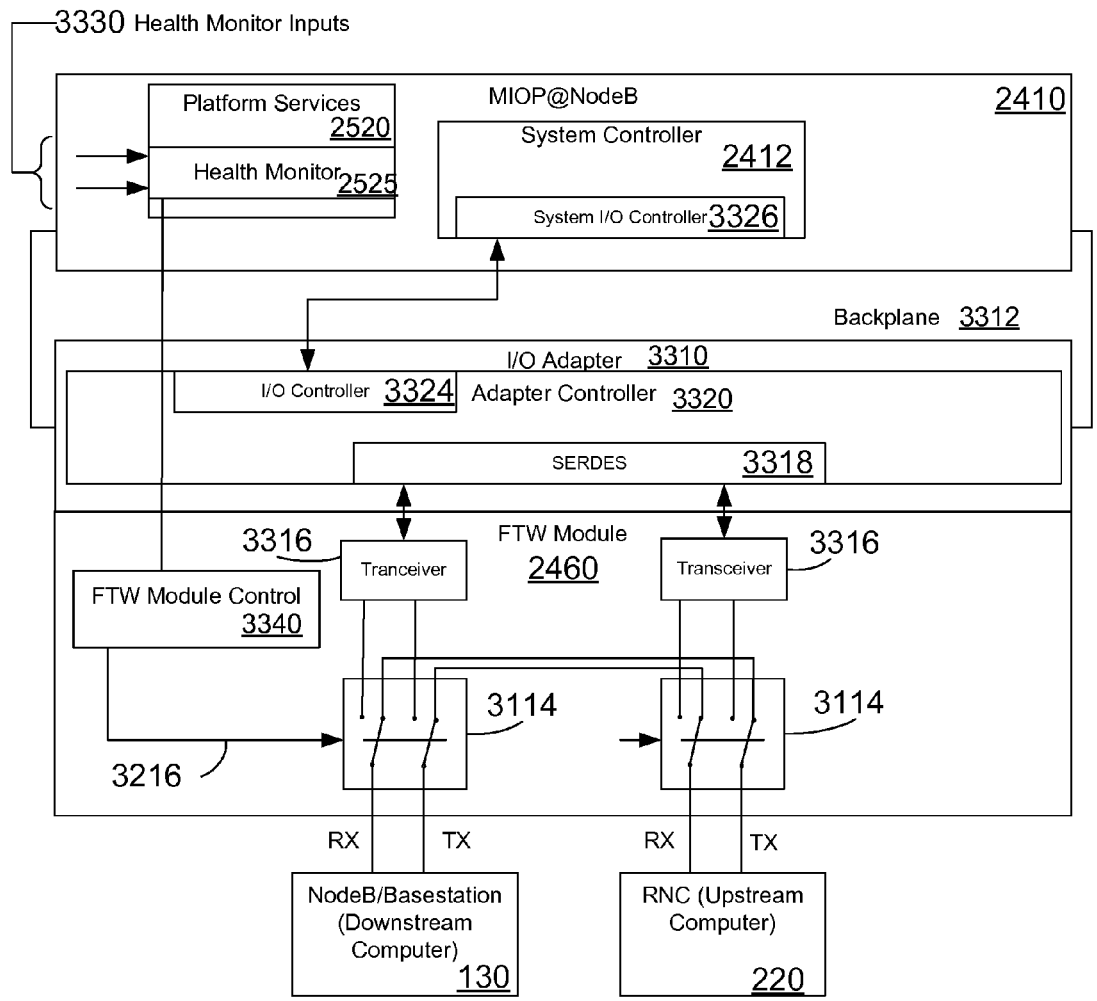
FIG. 34 is a block diagram that illustrates an alternative detailed example of the fail-to-wire module in the mobile data network described herein.

Again referring to FIG. 32, the activation of the switches 3114 is through a system health signal 3216 connected to a control input of each switch 3114. With the switches connected as described and shown in FIG. 32, the FTW module 2460 provides the network connections 32410 of the downstream computer and the upstream computer to the breakout system server (MIOP@NodeB) 2410 when the switches are activated. When the system health signal 3216 is not active the switch contacts are as shown in FIGS. 33 and 34 and the switches route the network connections 3210 through the FTW data path 3018. The system health signal 3216 is controlled by the health monitor 2525 in the breakout system server (MIOP@NodeB) 2410. In the specific example described herein the health monitor is a software mechanism that is part of the platform services mechanism 2520 introduced with reference to FIG. 25.

FIG. 33 is a block diagram that illustrates a more detailed example of the FTW module 2460 connected into a breakout system, in this case specifically the MIOP@NodeB 2410. The switches 3114 of the FTW module 2460 are connected to the NodeB or basestation (downstream computer) 130 and the RNC (upstream computer) 140 as described above. The FTW module 2460 is connected to the MIOP@NodeB 2410 through an I/O adapter 3310 connected to a backplane 3312. Components of the MIOP@NodeB 2410 such as the system controller 2412 are also connected to this same backplane 3312 so they can share data and control signals 3314 on the backplane 3312. In the illustrated example described herein the system controller is an X86 processor card as described above. Network signals 3214 from the FTW module 2460 are connected to transceivers 3316 in the I/O adapter 3310. Outputs from the transceivers 3316 are applied to a serializer-deserializer (SERDES) 3318 that is part of an adapter controller 3320 on the I/O adapter 3310. The adapter controller 3320 receives control input 3322 from the MIOP@NodeB 2410 through an I/O controller 3324 in the adapter controller 3320. The I/O controller 3324 in the adapter controller 3320 is connected to another I/O controller 3326 on the system controller 2412.

Again referring to FIG. 33, as described above the switches 3114 are controlled by a system health signal 3216 from a health monitor 2525. In this detailed example, the health monitor 2525 generates a control signal 3328 to the FTW module control 3340 which then generates the system health signal 3216 to the switches 3114. The FTW module control 3340 may contain various electronic circuits to control the FTW switches 3114. In this example, the FTW module control 3340 is controlled by the health monitor 2525. Further, in this example the health monitor 2525 is part of the platform services 2520 which is a software entity primarily executing on the system controller 2412. The health monitor 2525 has inputs 3330 that originate in various systems, both software and hardware to report the health of a subsystem.

FIG. 34 is a block diagram that illustrates another example of the FTW module 2460 connected to the MIOP@NodeB 2410. This example is essentially the same as the example shown in FIG. 33. In this example, some of the components have been moved into other blocks. Since the FTW module 2460 is connected physically close to the MIOP@NodeB some of the components can function in another block. In the illustrated example in FIG. 34, the FTW module control 3340 has been moved into the FTW module 2460. Similarly, the transceivers 3316 can also be moved into the FTW module 2460. In another example, the FTW module control 3340 located on the FTW module could incorporate the FTW control mechanism 2630 or portions of the FTW control mechanism 2630 such as the heartbeat mechanism 3718 as described further below.

As described above, the FTW module is preferably a removable module that connects into the breakout system. Since the de-activated switches place the FTW module in the fail-to-wire or bypass mode, all network data including voice and data streams between the downstream computer and the upstream computer are able to remain active on the FTW module when there is no power to the FTW module from the breakout server. This allows the FTW module to be removed from the failed breakout system or failed server without interrupting the network data connections, which also allows the breakout system to serviced or replaced. When it has been determined that the breakout system has failed and the FTW module is in the fail to wire mode, the FTW module can be removed from the breakout system. In the basestation of a typical mobile data network the FTW module would be plugged into a breakout system or MIOP@NodeB housed in t rack of computer equipment. The FTW module can be unplugged and then simply hung or secured on the rack holding the breakout system while the breakout out system is replaced with a new breakout system. The FTW module can then be hot plugged into the new breakout system. This means that the FTW module is plugged in while the network data connection on the FTW module is still active even though the FTW module is not powered up. The new breakout system can then be powered up and when it becomes operational the health monitor would activate the health signal to place the FTW module in the system network communication or breakout mode that uses the breakout data path to route signals to the breakout system.

Figure 35:
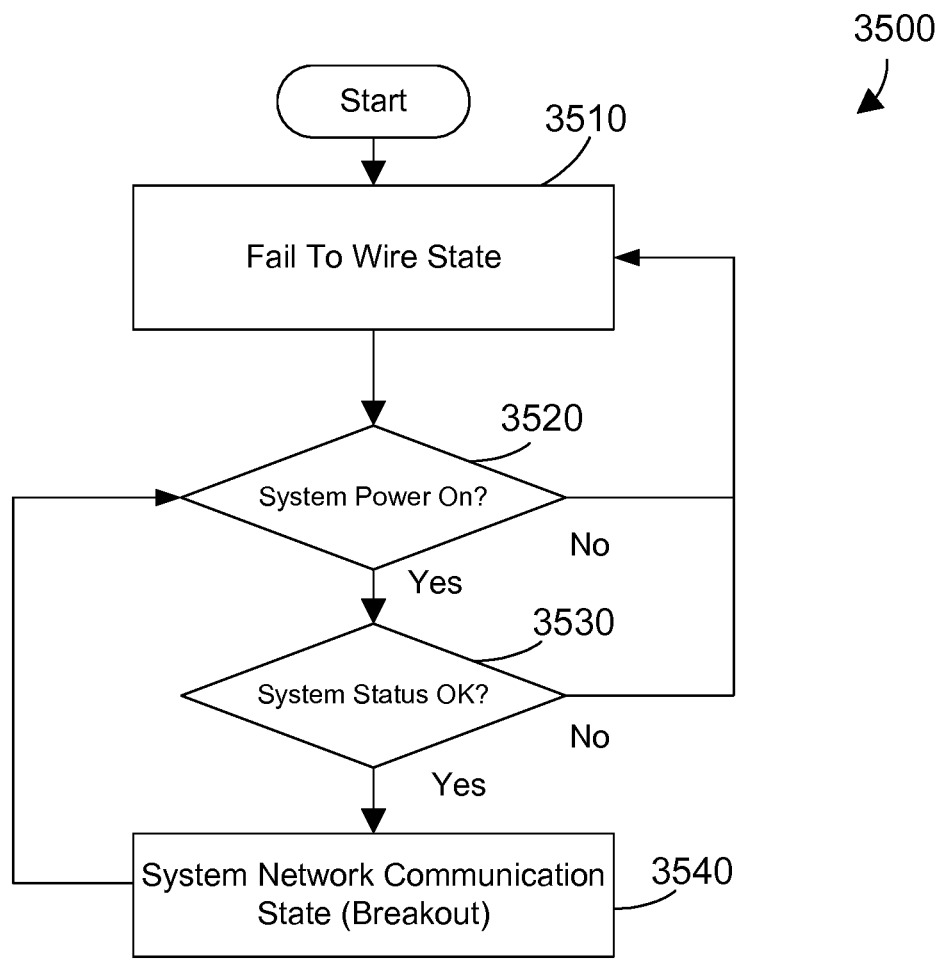
FIG. 35 is a flow diagram of a method for controlling the fail-to-wire module.

FIG. 35 is a flow diagram of a method 3500 for controlling the fail-to-wire module that preserves a primary data path connection from an upstream computer to a downstream computer if there is any kind of failure in a breakout data path to a breakout system. The steps of method 3500 are preferably performed by the health monitor in conjunction with the other components of the FTW module as described above. Method 3500 begins with the FTW module in the fail to wire state such that there is no network communication signal breakout (step 3510). Next determine if there is system power (step 3520). If there is no system power (step 3520=no) then return to step 3510. If there is system power (step 3520=yes) then check system status (check all the health monitor inputs) (step 3530). If the system status is not ok (step 3530=no) then return to step 3510. If the system status is ok (step 3510=yes) then start system network communication through the MIOP@NodeB (placing the system in the system network communication state) (step 3540). The method repeats in a loop the steps as described above.

Figure 36:
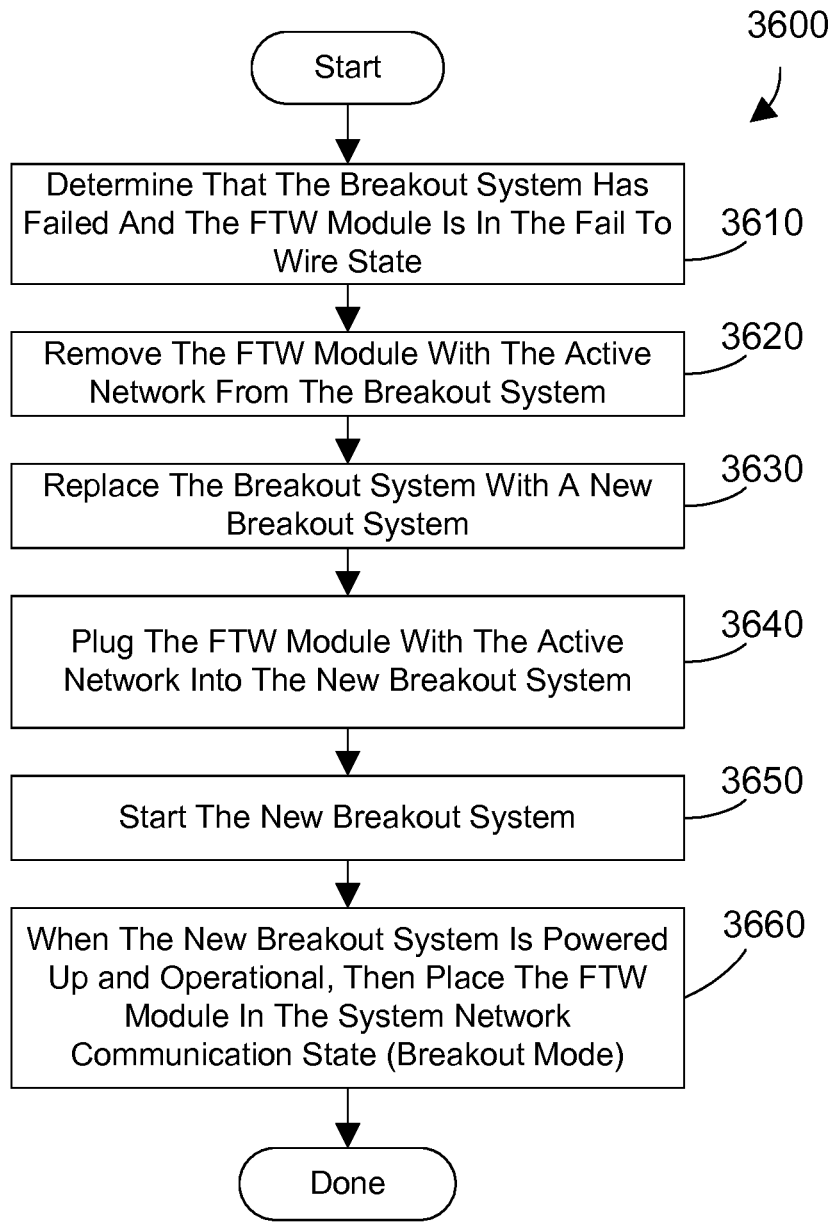
FIG. 36 is a flow diagram of a method for servicing a system connected to a network with a fail-to-wire module.

FIG. 36 is a flow diagram of a method for servicing a system connected to a network with a fail-to-wire module as described herein. First, determine that the breakout system has failed and the FTW module is in the fail-to-wire state (step 3610). Remove the FTW module with an active network from the breakout system (step 3620). Replace the breakout system with a new breakout system (step 3630). Plug the FTW module with the active network into the new breakout system (step 3640). Start the new breakout system (step 3650). Place the FTW module in the system network communication state or breakout mode (step 3660). The method 3600 is done. Note that the sequence of steps 3640 and 3650 may be reversed.

Figure 37:
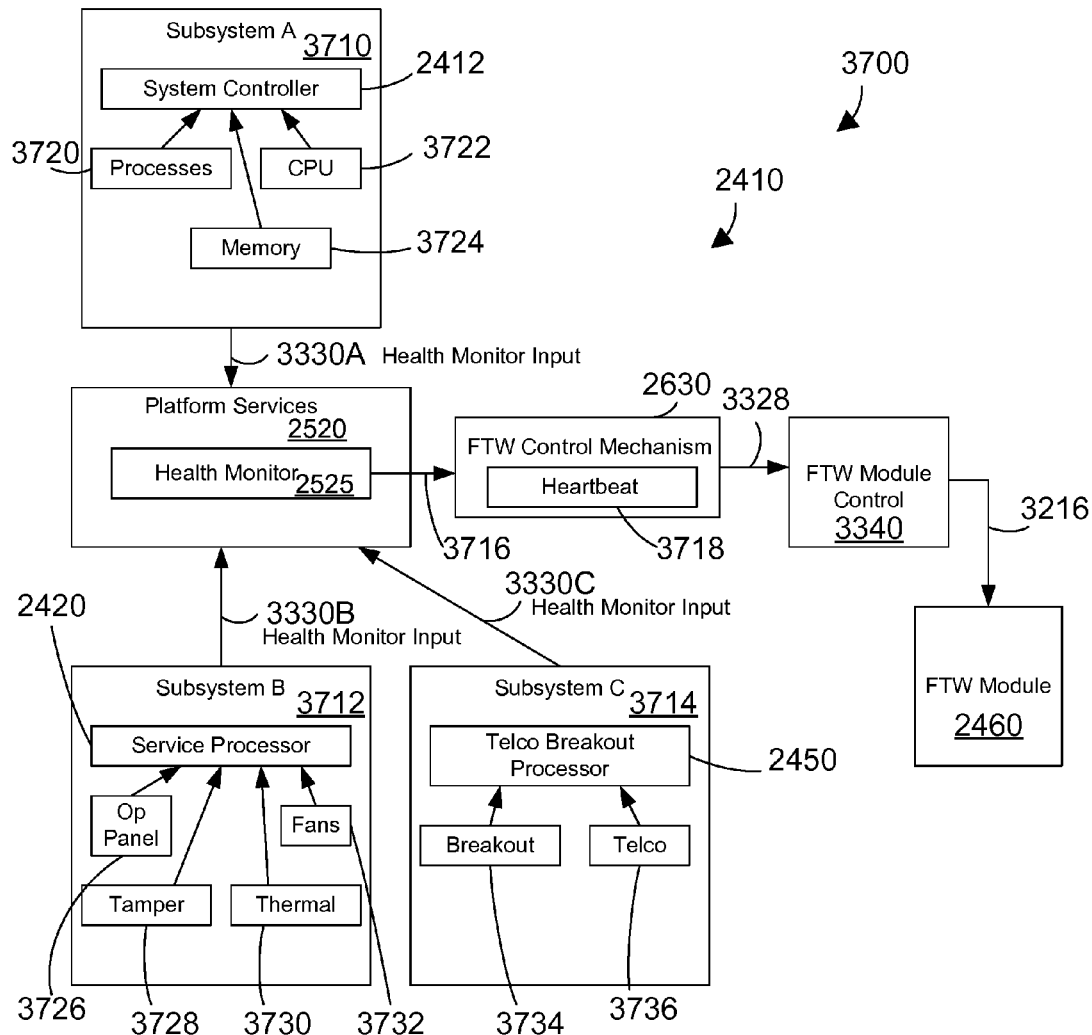
FIG. 37 illustrates a block diagram of an exemplary control architecture for the FTW module in a breakout system.

FIG. 37 illustrates a block diagram of an exemplary control architecture 3700 for the FTW module 2460 in a breakout system 2410 as described above. In this example, the health monitor 2525 in the platform services 2520 receives health monitor inputs 3330A-C from multiple subsystems which allows the health monitor to consider the complete health of the breakout system 2410 in determining whether to enable or disable the FTW module 2460. In the illustrated example, the health monitor 2525 receives health monitor input 3330A from subsystems A 3710, health monitor input 3330B from subsystem B 3712 and health monitor input 3330C from subsystem C 3714. Each of the subsystems may receive input from one or more control points as described below. As the breakout system 2410 boots, the FTW control mechanism 2630 (introduced with reference to FIG. 26) in conjunction with the health monitor 2525 ensure the FTW module 2460 is in the by-pass or FTW state until all the control points have had their status verified. As each subsystem in the breakout system initializes, the health monitor 2525 will monitor whether all required control points are accountable. During the initialization, some control points communicate their status to the health monitor via a software service. In other cases, the health monitor must request the status of certain control points to ensure of their health and level of initialization. When the health monitor and the FTW control mechanism 2630 have determined that all required control points are initialized or otherwise indicate a ready state, the breakout system 2410 is then ready to step into the telecommunications traffic flow. At that point, the FTW control mechanism 2630 will place the FTW module 2460 in the system network communication state, thereby putting the breakout system 2410 in the path of the telecommunication traffic flow as described above.

Again referring to FIG. 37, the health monitor 2525 gathers health monitor inputs 3330A-C from multiple intelligent subsystems. In the illustrated example, subsystem A 3710 is the system controller 2412 described above. Similarly, subsystem B 3212 is the service processor 2420 and subsystem C 3714 is the telco breakout processor 2450. The health monitor input 3330A includes health data from various control points gathered by the system controller. In this example, the control points include processes 3270 executing on the central processing unit (CPU) 3722 of the system controller 2412, the status inputs from the CPU 3722 and memory 3724. Processes 3270 could include such things as monitoring data queues to insure they are draining or being processed within specified limits. The service processor 2420 collects input from control points such as an operations panel 3726, tamper switches 3728, thermal indicators 3730 and fans 3732. The service processor communicates the health inputs 3330B to the health monitor 2525 over a universal serial bus (USB). In the illustrated breakout system, the telco breakout processor 2450 collects inputs from control points such as the breakout process 3734 and the telco communication process 3736. The breakout process 3734 and the telco communication process 3736 are critical processes of the breakout system 2410. The breakout process 3734 manages the breakout data streams of IP traffic from the voice traffic passed through the breakout system. The telco communication process 3736 handles all data flowing through the breakout system to the upstream and downstream mobile data network entities to place the breakout system as an active device in the mobile data network but appear as a passive device between the RNC 140 and the NodeB 130 (FIG. 1a) as show and described above. If either of these critical processes detect unrecoverable failures, the health monitor 2525 is alerted by the telco processor 2450. In the illustrated example herein, the telco breakout processor 2450 communicates the health monitor inputs 3330C to the health monitor over a PCIe bus on the backplane 3312 in FIG. 34.

Again referring to FIG. 37 the health monitor 2525 communicates on the control signal 3716 to the FTW control mechanism 2630 when the FTW module 2460 needs to change state to the FTW state. The FTW control mechanism 2630 communicates on the control signal 3328 to the FTW module control 3340 as described above. The FTW module control 3340 generates the health signal 3216 that activates switches in the FTW module 2460 to put the breakout system in line with the upstream and downstream computer systems as described above.

The fail to wire control system 3700 preferably includes a heartbeat mechanism 3718 that requires a periodic signal or pulse on signal 3716 from the health monitor to indicate the system is operating properly. If the periodic pulse from the health monitor fails a timing criteria, which indicates that the health monitor process is no longer running, then the FTW control mechanism 2630 will cause the system to enter the fail to wire state by in-activating the switches in the FTW module 2460 as described above. In the illustrate example, the heartbeat mechanism 3718 is a software entity in the FTW control mechanism 2630. Alternatively the heartbeat mechanism could be hardware connected to the FTW control mechanism and physically located on the FTW module control 3340 or on the service processor 2420. Timing criteria that signifies a failure could include an absence of any pulse, the time between pulses outside a given threshold, or any other defined interruption.

During breakout system operation, the health monitor 2525 and the FTW control mechanism 2630 periodically monitors the control points to ensure breakout system optimization can continue. If one of the control points is unresponsive or reports an error condition or non-operational status, the health monitor will determine the severity and disable the FTW module as needed to remove the breakout system from the telecommunication flow. During breakout system operation, some control points will communicate their status via a software service. If recovery actions are required, for example restarting and reinitializing an intelligent subsystem or all subsystems, the health monitor may manage inactivating the FTW module and then again activating it when re-initialization is complete.

Figure 38:
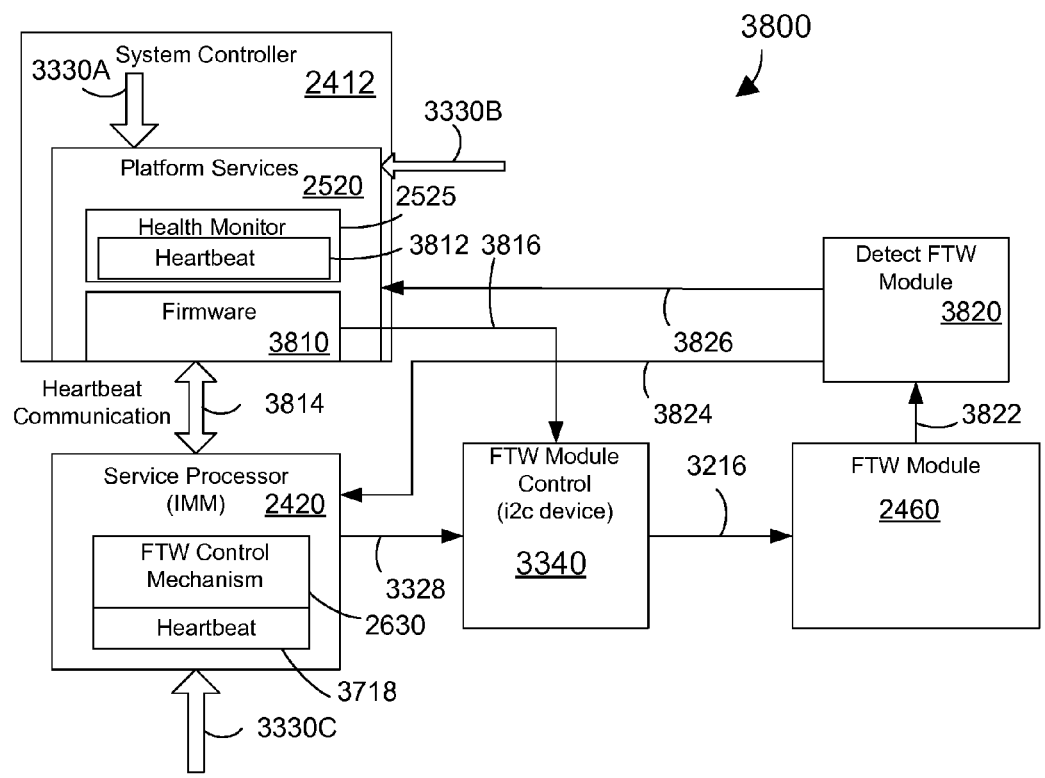
FIG. 38 illustrates a block diagram of a control architecture that is an example implementation of the control architecture shown in FIG. 37.

FIG. 38 illustrates a block diagram of a control architecture 3800 that is an example implementation of the control architecture 3700 shown in FIG. 37. In this example the platform services 2520 resides on the system controller 2412 as described above with reference to FIGS. 24 and 25. The inputs from the control points gathered by the system controller 2412 thus can communicate directly to the health monitor 2525 on the system controller. Similarly, in the illustrated example of FIG. 38, the FTW control mechanism 2630 with the heartbeat mechanism 3718 are part of the service processor 2420. FIG. 38 illustrates that the heartbeat monitor 2525 may communicate with the service processor 2420 through firmware 3810. The inputs 3330C from the control points gathered by the telco breakout processor 2450 (FIG. 37) are provided to the health monitor 2525 as described above with reference to FIG. 37.

FIG. 38 further illustrates an additional feature of the FTW control architecture 3800. A detect FTW Module 3820 detects the presence of the FTW module 2460 plugged into the breakout system as shown in FIG. 30. The detect FTW module 3820 signals to the platform services 2520 when the FTW module 2460 is physically present in the breakout system. This allows the breakout system to take appropriate action such as alerting the operator that the FTW module 2460 is no longer connected. The detect FTW module 3820 detects the presence of the FTW module 2460 with a detect signal 3822 applied to an input into the detect FTW module 3820. The presence of the FTW module can be detected in a manner of different ways using the detect signal 3822. For example, the detect signal 3822 on the FTW module 2460 can be tied low locally on the board but on the detect FTW module 3820 the signal is pulled high with a pull-up resistor (not shown). Thus, when the FTW module 2460 is removed the input will go high at the input to the detect FTW module 3820. The detect FTW module 3820 communicates the presence of the FTW module 2460 to the FTW control mechanism 2630 over signal 3824 and to the health monitor 2525 over signal 3826. The detect FTW module 3820 may be physically located on the I/O adapter 3310 or on the backplane 3312 shown in FIG. 33.

FIG. 38 further illustrates a reliability feature of the FTW control architecture 3800. The FTW module control 3340 includes two redundant input path, one path from two different intelligent subsystems. In the illustrate example, the FTW module control 3340 has an input 3328 from the FTW control mechanism 2630 as described above, and in addition a second control signal 3816 directly from the firmware 3810 used by the health monitor 2525 to communicate with hardware. If one of these subsystems is not operational, the other will be able to disable the switches in the FTW module 2460 when necessary to ensure the breakout system is removed from the telecommunications traffic flow if there is a failure of the breakout system. In the illustrated example, the FTW module control 3340 is an industry standard Inter-Integrated Circuit (i2c) device that uses an industry standard serial communication protocol, and the control signals 3328 and 3816 are i2c control signals.

Again referring to FIG. 38, the heartbeat monitor 2525 may also include a heartbeat mechanism 3812 similar to the one described above. The heartbeat mechanism 3812 monitors heartbeat communication 3814 between the firmware 3810 and the FTW control mechanism 2630 in the service processor 2420 to determine if the FTW control mechanism 2630 is operating properly by insuring communication is occurring at the proper intervals which indicates the processes of the service processors are not hung. If the heartbeat mechanism 3812 identifies a failure the health monitor 2525 can initiate a fail to wire state independent of the service processor 2420 by communicating directly to the FTW module control 3340 over the i2c control signal 3816. Thus this optional dual heartbeat monitors can insure that failure detected by either the health monitor 2525 or the FTW control mechanism 2630 will initiate the fail to wire state in the FTW module 2460 to maintain the integrity of the network communication between the upstream and downstream computers in the event of a failure on the breakout system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language, Streams Processing language, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The methods disclosed herein may be performed as part of providing a web-based service. Such a service could include, for example, offering the method to online users in exchange for payment.

The disclosure and claims are directed a removable fail-to-wire (FTW) module that preserves a primary data path connection from an upstream computer to a downstream computer if there is any kind of failure in a breakout data path to a breakout system. The switches in the FTW module are closed to preserve the primary data path in the non-activated state so the FTW module can be extracted from a failed breakout system, allowing the breakout system to serviced or replaced. The health monitor provides intelligent switch control based on alerts from a variety of control points. These control points include firmware, hardware, thermal sensors, subsystem operating systems, subsystem software applications, and appliance tamper logic in order to determine if the FTW module switches should be in an active or inactive state.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:
1. An apparatus for a mobile data network comprising:
a breakout system for communicating with a basestation that transmits and receives radio signals to and from user equipment, wherein the basestation is part of a radio access network that communicates with a core network in the mobile data network, the breakout system having an enclosure; the breakout system further comprising:
a fail-to-wire (FTW) module with a primary network data path that connects an upstream computer to a downstream computer and a breakout network data path that connects the upstream computer and the downstream computer to the breakout system;
a plurality of switches that switch between the primary network data path and the breakout network data path, wherein the switches in an inactivated state preserve the primary data path and in an activated state route input connections from the upstream computer and the downstream computer on the breakout data path to the breakout system;

a control input to the switches driven by a system health signal that activates the plurality of switches to connect the breakout data path when the breakout system is operational;

a health monitor that receives health inputs from a plurality of intelligent subsystems of the breakout system to determine a health of the breakout system and in response drive the health signal to activate the plurality of switches;

a heartbeat mechanism and a periodic signal from the health monitor, wherein the heartbeat mechanism requires the periodic signal from the health monitor to indicate that the health monitor is running properly, and the heartbeat mechanism indicates a failure and causes the breakout system to enter a fail to wire state by inactivating the switches in the FTW module when the periodic signal fails to satisfy at least one timing criteria;

a second heartbeat mechanism in a subsystem containing the health monitor, wherein the second heartbeat mechanism requires the periodic signal from a FTW control mechanism to indicate that the FTW control mechanism is running properly and indicates a failure if the periodic signal fails to satisfy at least one timing criteria; and a FTW control module that receives a health signal from the health monitor and a health signal from the FTW control mechanism, wherein the FTW control module activates the health signal to the FTW module if one or both of the first heartbeat mechanism and the second heartbeat mechanism indicates a failure.

2. The apparatus of claim 1 wherein the plurality of intelligent subsystems each gather input that indicates an aspect of system health from a plurality of control points.

3. The apparatus of claim 2 wherein the control points are chosen from the following: processes executing on the system processor, CPU status, memory status, operations panel status, tamper status, thermal status, fans status, breakout system status and telco system status.

4. The apparatus of claim 1 wherein the heartbeat mechanism is part of the FTW control mechanism executing on a service processor.

5. The apparatus of claim 1 wherein the heartbeat mechanism is a hardware circuit that is part of a FTW module control circuit on the FTW module.

6. The apparatus of claim 1 further comprising a detect FTW module circuit that detects whether the FTW module is plugged into the breakout system and sends a corresponding signal to the health monitor.

7. The apparatus of claim 6 wherein the detect FTW module circuit further detects whether the FTW module is plugged into the breakout system and sends a corresponding signal to the FTW control mechanism.

8. A mobile data network comprising:

a plurality of basestations each communicating with a corresponding antenna that transmits and receives radio signals to and from user equipment, wherein the plurality of basestations are part of a radio access network that communicates with a core network in the mobile data network;

a breakout system associated with one of the plurality of basestations, the breakout system having an enclosure;

a fail-to-wire (FTW) module with a primary network data path that connects an upstream computer to a downstream computer and a breakout network data path that connects the upstream computer and the downstream computer to the breakout system;

a plurality of switches that switch between the primary network data path and the breakout network data path, wherein the switches in an inactivated state preserve the primary data path and in an activated state route input connections from the upstream computer and the downstream computer on the breakout data path to the breakout system;

a control input to the switches driven by a system health signal that activates the plurality of switches to connect the breakout data path when the breakout system is operational;

a health monitor that receives health inputs from a plurality of intelligent subsystems of the breakout system to determine a health of the breakout system and in response drive the health signal to activate the plurality of switches, wherein the plurality of intelligent subsystems each gather input that indicates an aspect of system health from a plurality of control points;

a heartbeat mechanism and a periodic signal from the health monitor, wherein the heartbeat mechanism requires the periodic signal from the health monitor to indicate that the health monitor is running properly, and the heartbeat mechanism indicates a failure and causes the system to enter a fail to wire state by inactivating the switches in the FTW module when the periodic signal fails to satisfy at least one timing criteria;

a second heartbeat mechanism in a subsystem containing the health monitor, wherein the second heartbeat mechanism requires the periodic signal from a FTW control mechanism to indicate that a FTW control mechanism is running properly to the health monitor and indicates a failure if the periodic signal fails to satisfy at least one timing criteria; and a FTW control module that receives a health signal from the health monitor and a health signal from the FTW control mechanism, wherein the FTW control module activates the health signal to the FTW module if one or both of the first heartbeat mechanism and the second heartbeat mechanism indicates a failure.

9. The mobile data network of claim 8 wherein the control points are chosen from the following: processes executing on the system processor, CPU status, memory status, operations panel status, tamper status, thermal status, fans status, breakout system status and telco system status.

10. The mobile data network of claim 8 wherein the heartbeat mechanism is part of the FTW control mechanism executing on a service processor.

11. The mobile data network of claim 8 wherein the heartbeat mechanism is a hardware circuit that is part of a FTW module control circuit on the FTW module.

12. The mobile data network of claim 8 further comprising a detect FTW module circuit that detects whether the FTW module is plugged into the breakout system and sends a corresponding signal to the health monitor.

13. The mobile data network of claim 12 wherein the detect FTW module circuit further detects whether the FTW module is plugged into the breakout system and sends a corresponding signal to the FTW control mechanism.

14. A mobile data network comprising:

a plurality of basestations each communicating with a corresponding antenna that transmits and receives radio signals to and from user equipment, wherein the plurality of basestations are part of a radio access network that communicates with a core network in the mobile data network;

a breakout system associated with one of the plurality of basestations, the breakout system having an enclosure;

a fail-to-wire (FTW) module with a primary network data path that connects an upstream computer to a downstream computer and a breakout network data path that connects the upstream computer and the downstream computer to the breakout system;

a plurality of switches that switch between the primary network data path and the breakout network data path, wherein the switches in an inactivated state preserve the primary data path and in an activated state route input connections from the upstream computer and the downstream computer on the breakout data path to the breakout system;

a control input to the switches driven by a system health signal that activates the plurality of switches to connect the breakout data path when the breakout system is operational;

a health monitor that receives health inputs from a plurality of intelligent subsystems of the breakout system to determine a health of the breakout system and in response drive the health signal to activate the plurality of switches, wherein the plurality of intelligent subsystems each gather input that indicates an aspect of system health from a plurality of control points; and a heartbeat mechanism and a periodic signal from the health monitor, wherein the heartbeat mechanism requires the periodic signal from the health monitor to indicate that the health monitor is running properly, and the heartbeat mechanism indicates a failure and causes the system to enter a fail to wire state by inactivating the switches in the FTW module when the periodic signal fails to satisfy at least one timing criteria.

15. The mobile data network of claim 14 wherein the control points are chosen from the following: processes executing on the system processor, CPU status, memory status, operations panel status, tamper status, thermal status, fans status, breakout system status and telco system status.

16. The mobile data network of claim 14 further comprising:
   a second heartbeat mechanism in a subsystem containing the health monitor, wherein the second heartbeat mechanism requires the periodic signal from a FTW control mechanism to indicate that the FTW control mechanism is running properly to the health monitor and indicates a failure if the periodic signal fails to satisfy at least one timing criteria;
   a FTW module control that receives a health signal from the health monitor and a health signal from the FTW control mechanism,
   wherein the FTW control module activates the health signal to the FTW module if one or both of the first heartbeat mechanism and the second heartbeat mechanism indicates a failure.

17. The mobile data network of claim 14 further comprising a detect FTW module circuit that detects whether the FTW module is plugged into the breakout system and sends a corresponding signal to the health monitor.

\* \* \* \* \*